(12) United States Patent
Gordy et al.

(10) Patent No.: US 6,898,632 B2
(45) Date of Patent: May 24, 2005

(54) NETWORK SECURITY TAP FOR USE WITH INTRUSION DETECTION SYSTEM

(75) Inventors: Stephen C. Gordy, Sunnyvale, CA (US); Henry D. Poelstra, Ottawa (CA); Robert W. Otis, San Jose, CA (US); Tom Gallatin, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 205 days.

(21) Appl. No.: 10/409,006

(22) Filed: Apr. 7, 2003

(65) Prior Publication Data

US 2005/0005031 A1 Jan. 6, 2005

Related U.S. Application Data

(60) Provisional application No. 60/459,166, filed on Mar. 31, 2003.

(51) Int. Cl.[7] .............................................. G06F 15/173
(52) U.S. Cl. ........................ 709/224; 709/226; 709/229
(58) Field of Search ................................ 709/224, 226, 709/229; 713/200, 201

(56) References Cited

U.S. PATENT DOCUMENTS 5,940,376 A    8/1999  Yanacek et al.
5,956,337 A  * 9/1999  Gaddis ..................... 370/395.1
6,026,442 A    2/2000  Lewis et al.
6,441,931 B1 * 8/2002  Moskovich et al. ........... 398/9

* cited by examiner

Primary Examiner—Mehmet B. Geckil
(74) Attorney, Agent, or Firm—Workman Nydegger

(57) ABSTRACT

A system and method is presented for analyzing information in a communication line for unwanted intrusions and for allowing information to be transmitted back into the communication line without disrupting the communication traffic when an intrusion is detected. The system and method includes a security tap connected to a firewall. The security tap is also connected to an intrusion detection device. The intrusion detection device analyzes the information in the communication line for indicia of attempts to compromise the network. When such indicia is detected, the intrusion detection device sends a "kill" data packet back through the security tap and directed back to the communication line to the firewall to instruct the firewall to prevent further communications into the network by the intrusive source. An Ethernet switch or field programmable gate array (FPGA) is incorporated in the security tap to coordinate the transmission of the "kill" data packet to avoid data collisions with data transmissions already existing in the communication line.

30 Claims, 23 Drawing Sheets

NETWORK SECURITY TAP FOR USE WITH INTRUSION DETECTION SYSTEM

RELATED APPLICATIONS

This application claims the benefit of U.S. Provisional Patent Application Ser. No. 60/459,166 filed Mar. 31, 2003, entitled "Network Security Tap For Use With Intrusion Detection System," which is incorporated herein by reference.

BACKGROUND OF THE INVENTION

1. The Field of the Invention

The present invention relates to network taps for providing access to network data for analysis purposes. In particular, the invention relates to a network tap that permits data packets from an intrusion detection system to be transmitted onto the network.

2. The Relevant Technology

In recent years, it has been desirable to be able to monitor and analyze the data flow in communication channels between and within networks. Some of these reasons include monitoring the communication channel for certain types of data, identifying and diagnosing network problems, detecting interruptions in the communication channel, detecting degradation in the communication channel, and the like. Thus, network taps, which are systems for tapping into communication lines, have been developed. In general, a network tap is a device that is positioned in-line in a communication line and enables network analyzers or other devices to have access to a copy of the data transmitted over the communication line. A network tap is typically installed by physically cutting or breaking a network cable and positioning the tap between the two ends of the network cable. Once the tap is installed, network analyzers or other devices can access the network data without having to manipulate the network cable or altering the topology of the network. Moreover, conventional network taps enable access to the network data without disrupting or modifying the network data or the topology of the network.

Systems using conductors composed of metallic materials such as copper or other low resistance metals have generally been relatively easy to monitor and evaluate without great disruption or intrusion into the communication channel since current flows throughout the entire conductor and portions of the conductor can be externally tapped with another conductor attached to the test equipment that bleeds off a negligible amount of test current.

Additionally, optical fibers that transmit light have also been used as communication channel medium and have proven to be advantageous for the transmission of large amounts of information, both in digital and analog form. Optical fibers, unlike metallic conductors, propagate the information signal in a constrained directional path. Furthermore, the optical signal propagates down a very narrow internal portion of the conductor, making the non-intrusive external tapping of the fiber impractical. Therefore, in order to monitor data transmitted on an optical fiber, a splitter, also known as a coupler, must be placed in-line with the optical fiber to reflect a portion of the light from the main optical fiber to another optical fiber that can be coupled to a network analyzer or other test equipment.

In recent years, the market for network security systems has also increased and is expected to continue to rise over the next few years. Indeed, security systems are almost a necessity in any enterprise local area network system to prevent unwanted intrusions by unauthorized people. Security systems typically comprise a firewall and/or an intrusion detection system. A firewall generally consists of one or more filters placed in the flow of communication to block the transmission of certain classes of traffic. Alternatively, a firewall may consist of one or more gateways that permit traffic flow into a network system. However, firewalls are sometimes defeated, which can result in unauthorized individuals gaining access to the network.

Intrusion detection systems are network security devices that identify suspicious patterns that may indicate a network or system attack from someone attempting to break into or compromise the network. For example, an intrusion detection system may be implemented to prevent against, among other things, access by hackers or deployment of viruses. In order to detect such intrusions, the intrusion detection system must have access to the data flow in a communication line that is in communication with the firewall. The intrusion detection system analyzes the data for indicia of intrusions.

Firewalls and intrusion detection systems are usually appliances or software applications implemented on servers or client computers in a network. When implemented as an appliance, a firewall and an intrusion detection system are usually separate devices connected to each other and to the network through multiple communication lines and/or switches.

An exemplary security system 10 of the prior art is shown in FIG. 1. System 10 includes a firewall 12 and tap 14 disposed in communication with a communication line 16. Communication line 16 comprises an incoming communication line 18 and an outgoing communication line 20, which are typically bundled in a single cable, such as an RJ-45 Ethernet cable. Firewall 12 and tap 14 are generally placed in a strategic location between the other infrastructure of local area network 11 and Internet 15. Communication line 16 is connected to an intrusion detection system 22 and a dedicated network analyzer or other testing equipment 24 through tap 14. That is, tap 14 includes couplers 26, 28 or other components that enable intrusion detection system 22 and testing equipment 24 to be placed in communication with the data flow in communication line 16.

Tap 14 may be configured to allow access to data transmitted over either a metallic conductive or an optical fiber communication line 16 as will be understood by those of skill in the art. In general, network taps, such as tap 14, transmit data obtained from communication line 16 in a uni-directional manner to connected devices which, in the example illustrated in FIG. 1, include the intrusion detection system 22 and the testing equipment 24. Conventional network tap 14 does not permit devices connected thereto to transmit data onto communication line 16. Network taps were originally developed to enable testing equipment to access network data and it has generally been understood that network taps should not modify the data on communication line 14 and/or 16 or add data thereto. Indeed, conventional network taps do not have a network presence, meaning that they are transparent to other devices on the network and the network operates as if the network tap did not exist. Thus, the flow of data over communication lines 19, 21, 23 and 25 to devices that access the network via tap 14 is uni-directional and the backflow of data to communication line 16 through tap 14 is prohibited.

With the advent of intrusion detection systems, network taps began to be used to provide such intrusion detection systems with access to network data. However, because conventional network taps permit only unidirectional data flow to connected devices, intrusion detection systems have been configured to communicate with the firewall through an additional external, or out-of-band, communication line 30. A switch 32 (e.g., an Ethernet switch) is positioned on communication line 30 to direct data packets to firewall 12. This architecture enables intrusion detection system 22 to identify indicia of unauthorized access and to issue kill packets to firewall 12 to prevent additional unauthorized access. In fact, the intrusion detection system 22 can send any type of authorized packets through tap 14 to the firewall 12 and the LAN 11 as necessary.

It will be appreciated that the additional communication line 30 and switch 32 between intrusion detection system 30 and firewall 12 presents additional hardware that needs to be purchased and configured. Furthermore, switch 32 is often expensive. It would thus be an advantage to reduce the number of communication lines required to connect a communication line evaluation device, an intrusion detection system and/or firewall to a network. Furthermore, it would be an advantage to reduce the expense of having an extra switch to allow the intrusion detection system to communicate with the firewall.

BRIEF SUMMARY OF THE INVENTION

The present invention is directed to network security taps for analyzing or monitoring one or more communication lines in a network system. The security taps are configured to tap into a communication line that is connected to a firewall. The firewall filters the data packets flowing therethrough to prohibit unwanted data packets from entering the network system. After being filtered by the firewall and processed by the security tap, the data enters into the network system through a network switch.

The security taps are configured to be connected to an intrusion detection system and, optionally, one or more testing equipment devices. The security tap includes buffers or other devices to direct a copy of the network data to the attached devices, including the intrusion detection system and any testing equipment. Kill packets or other related data is permitted to be transmitted from the intrusion detection system to the firewall through the security tap. The security tap therefore includes a routing node configured to route the data flow from the intrusion detection system to the firewall. This capability is in contrast to conventional network taps, which permit only uni-directional data flow from the communication line to the attached devices.

In one embodiment, the routing node is an Ethernet switch that routes packets flowing through the security tap to their correct destinations. As part of this function, the Ethernet switch directs data packets from the intrusion detection system to the firewall. When the intrusion detection system identifies indicia of intrusive activity, the intrusion detection system sends a kill packet to the firewall via the security tap and the integrated Ethernet switch. The kill packet is routed by the Ethernet switch to the firewall. The firewall is programmed by the kill packet to prohibit any further intrusions by the intrusive source.

In another embodiment, the routing node is a Field Programmable Gate Array (FPGA). The FPGA can be programmed to coordinate the flow of data in the security tap, similar to that performed by the Ethernet switch. The FPGA contains a processing module which controls the process logic by which the FPGA controls the data flow therethrough. In addition, the FPGA includes internal buffers that are used to coordinate the data flow. The buffers are used to avoid data collisions that might otherwise occur as data packets from the intrusion detection system are inserted onto the communication line that is in communication with the firewall. The FPGA buffers the data packets from the intrusion detection system until such time that they can be inserted onto the communication line without colliding with other data packets that are already on the network.

The FPGA can also be programmed to control other components of the security tap. In addition, the FPGA can be connected to an external client device which enables the FPGA to be programmed by the network administrator or upgraded. As such, it will be appreciated that the FPGA provides integrated circuitry which enhances the functionality of the security tap.

The network security taps of the invention permit the intrusion detection systems to communicate with the firewall directly through the taps. This is in contrast to conventional network taps that do not allow the backflow of data from attached devices to the communication that has been tapped. The network security taps of the invention eliminate the need for the out-of-band communication link between the intrusion detection system and the firewall.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
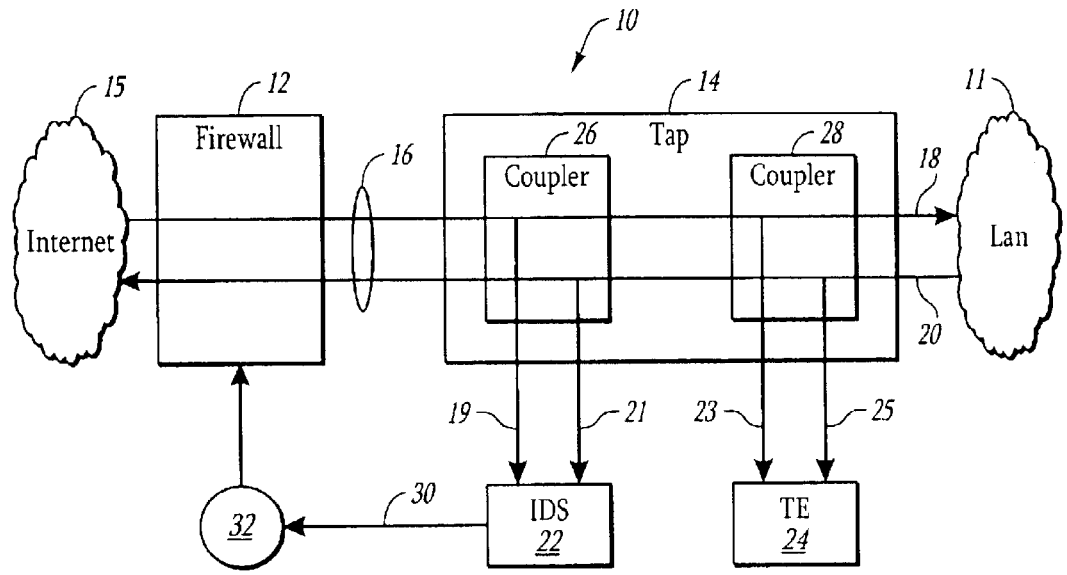
FIG. 1 illustrates a block diagram of a prior art system incorporating an intrusion detection system in communication with a firewall through an external communication line.

The present invention relates to network security taps and associated systems incorporating various security features for monitoring and evaluating network data. The network security taps of the invention permit intrusion detection systems to access network data and to send kill packets (as well as other packets), as necessary, to the firewall and a local area network through the network security taps.

1. Overview of Operation of Security Taps

FIGS. 2A through 2E illustrate exemplary systems 100A through 100E incorporating security taps 110A through 110E that implement features of the present invention. The security taps are illustrated in FIGS. 2A through 2E at a conceptual level, and the details of the circuitry of the security taps of the invention are disclosed hereinbelow in reference to FIGS. 3 through 9B. It will be appreciated that many of the elements in FIGS. 2A through 2E are similar. As such, like elements are referred to with like reference numerals, using the letters A through E to distinguish the various embodiments. Thus, a detailed description of system 100A in FIG. 2A will be provided with the understanding that many of the details apply to the systems 100B through 100E. However, discussion will be provided, where necessary, where new reference numbers are introduced.

Figure 2A:
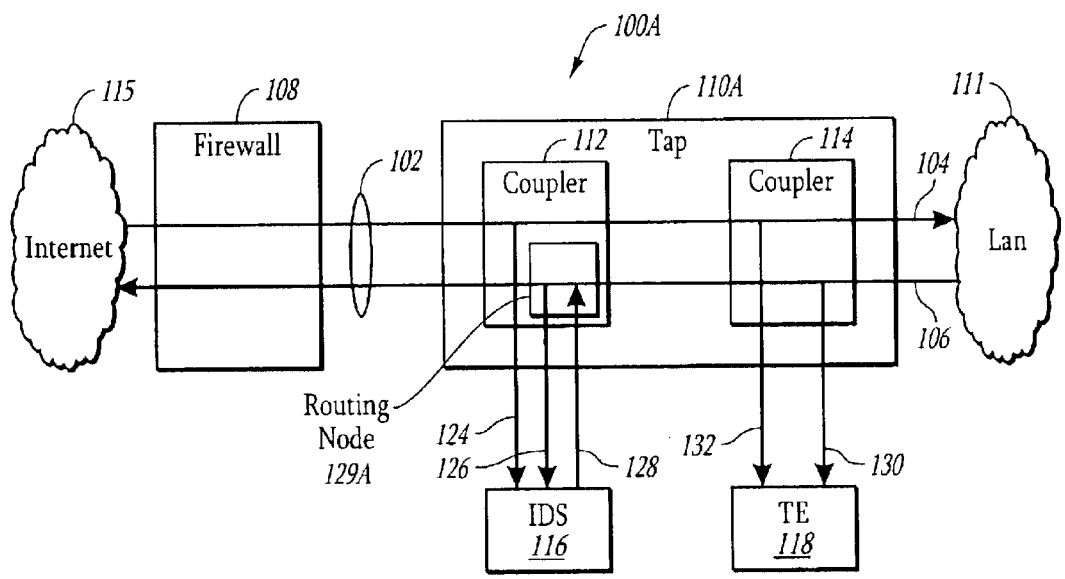
FIG. 2A illustrates a block diagram of an exemplary security tap according to one embodiment of the present invention.

As depicted in FIG. 2A, an exemplary configuration for a system 100A embodying features of the present invention is illustrated. It will be appreciated that system 100A may be implemented in communication systems comprising either conductive metal or optical fiber communication lines. System 100A is configured to analyze data carried by a main network cable 102. As shown in FIG. 2A, network cable 102 includes an incoming communication line 104 and an outgoing communication line 106. In Gigabit Ethernet, however, the communication lines are full-duplex, which means they are "receive" and "transmit" at different times on the same physical lines. The terms "incoming" and "outgoing", as used herein, are from the standpoint of the local area network 111.

Network cable 102 is connected to a firewall 108. Firewall 108 filters the data packets that are transmitted on communication lines 104 and 106, and controls the data that is permitted to pass between local area network 111 and Internet 115. Because firewall 108 acts generally as a filter, certain unwanted data can pass therethrough until firewall 108 is programmed to filter that particular unwanted data. Firewall 108 acts in unison with an intrusion detection device to maximize its filtering capabilities to prevent unwanted intrusions, as will be discussed further below.

Network cable 102 is also connected to a security tap 110A. Security tap 110A is configured with a pair of dedicated couplers 112, 114. Couplers 112 and 114 allow an intrusion detection system 116 and a testing equipment 118 to be connected to security tap 110A. Couplers 112 and 114 are configured to enable a portion of the energy of the data signal of network cable 102 to be tapped and transmitted to intrusion detection system 116 and/or testing equipment 118. In some cases, the energy of the signal is not decreased at all; rather, it is increased, because it is regenerated within the security tap 110A. Intrusion detection system 116 and testing equipment 118 are some examples of "attached devices" that may be connected to security tap 110A. However, an "attached device" may be any equipment which is selectively connectable to security tap 110A to be allowed to communicate with security tap 110A. Again, it is noted that the details of the circuitry and, in particular, the couplers 112 and 114, that permit network data to be tapped and routed according to this and other embodiments of the invention are disclosed in reference to FIGS. 3 through 8B below.

The intrusion detection system 116 is connected to security tap 110A via a communication line 124 that carries a representation of the signal that is transmitted on communication line 104. The intrusion detection system is also connected to security tap 110A by a communication line 126 that carries a representation of the signal that is transmitted on communication line 106. In addition, a communication line 128 from intrusion detection system 116 is coupled to outgoing communication line 106. Communication line 128 conveys information from intrusion detection system 116 to communication line 106. That is, security tap 110A is configured to allow intrusion detection system 116 to send information into the security tap, whereas conventional taps do not allow such functionality.

In further detail, coupler 112 is configured with a routing node 129A positioned at the node where communication lines 106, 126 and 128 intersect. As used herein, the term "routing node" refers to a component of the network security tap that permits data packets from the intrusion detection system or other attached data devices to be inserted into the main communication cable so that the data packets can be transmitted to a firewall or another designated network location. In general, the routing node is positioned at the intersection of the main communication cable and the communication line from one or more attached devices. In general, the routing node can include any component that permits data packets from the intrusion detection system to be inserted onto the main communication cable without modifying or being intrusive with respect to the data that is otherwise transmitted thereon. Examples of routing nodes include the Ethernet switches and the Field Programmable Gate Arrays (FPGAs) disclosed herein. It is noted that the term "routing node" does not necessarily connote a conventional router or the function of a conventional router, but is instead a general term intended to encompass any suitable component that can control the placement or insertion of data packets from the intrusion detection system or other attached data device as set forth above.

Routing node 129A controls the flow of data packets sent from intrusion detection system over communication line 128 to communication line 106. Routing node 129A may be implemented in embodiments having either metallic conductive wires or optical fibers. In the embodiment of FIG. 2A, routing node 129A has a limited function of directing the flow of information over the junction of communication line 106 and communication line 128 without disrupting the other data packets carried on communication lines associated with system 10A. The operation of routing node 129A will be described in more detail below.

Test equipment 118 is connected to security tap 110A via communication lines 130, 132 that carry a representation of the signal that is transmitted on communication lines 106 and 104, respectively. The information from communication lines 130, 132 is sent to testing equipment 118 for analysis. In general, testing equipment 118 can be any network analyzer or other device that requires non-intrusive access to the network data. For example, the testing equipment 118 can obtain and display statistics associated with the network data; can analyze the type of data in network cable 102, the integrity of the communication flow in network cable 102, or interruptions in network communication; can search for specific patterns, detects errors, etc.

As illustrated in FIG. 2A, communication lines 130, 132 connecting testing equipment 118 with security tap 110A are configured to allow uni-directional data flow. That is, testing equipment 118 generally only receives data. However, it will be appreciated that embodiments where testing equipment 118 transmits data into security tap 110A are contemplated.

Intrusion detection system 116 monitors the traffic on network cable 102 and determines whether there are indicia indicating that an attempt to breach the security associate with local area network 111 is being made. Generally, intrusion detection system 116 is programmed with various algorithms that enable it to detect certain intrusive activity. For example, intrusion detection system 116 may compare the source material and compare the signatures to a database of known attack signatures, compare the traffic load to a baseline traffic load, raising a warning if the traffic load exceeds the baseline to indicate increased activity in the communication line, or detect for anomalies in the data flow, for network attacks, hacking, and the like. The network security taps of the invention can be used or adapted for use with substantially any conventional intrusion detection system or other intrusion detection systems that will be developed in the future.

When an intrusion is suspected, intrusion detection system 116 sends a command in the form of one or more data packets (referred herein as "kill packets") through communication line 128, which are directed by routing node 129A into outgoing communication line 106 to firewall 108. The security tap 110A may also be configured to route the kill packets or other related data packets to other nodes in the local area network 111. The data packets instruct (i.e., reprogram) firewall 108 to place a filter on a specific IP address that appears to be associated with the potential intrusion. That is, the data packets sent from intrusion detection system 116 reprogram firewall 108 to prevent further passage of information coming from the suspected intrusive source. Intrusion detection system 116 may also maintain a log of activity of the network on which security tap 110A is placed. System 100A thus provides a dynamic, learning network security system.

As discussed above, it has been undesirable in the past to send data packets back into a communication line through tapping devices for various security reasons, including possibility of data collisions, losing data packets, and decreasing network integrity. However, in the present invention, routing node 129A allows limited information to be transmitted into communication line 102 from intrusion detection system 116, thereby greatly enhancing the ability of an intrusion detection system to operate in an integrated manner in a network.

In the embodiment of FIG. 2A, security tap 110A is largely a passive device, generally remaining idle until an indication of unwanted intrusion is detected. Only then does the intrusion detection system 116 send information to communication line 102. With coupler 112 incorporating the routing node 129A, data collisions can be avoided in communication line 102, ensuring that data is not lost and is efficiently sent from both outgoing communication line 106 and intrusion detection system 116. The security taps of the present invention thus provide added security features without compromising the integrity of the system. Furthermore, security taps of the present invention are non-intrusive, allowing the security tap to continue to analyze network communications without interrupting the flow of traffic on communication line 102. It will be appreciated that security tap 110A may be configured to monitor and analyze multiple communication channels.

Figure 2B:
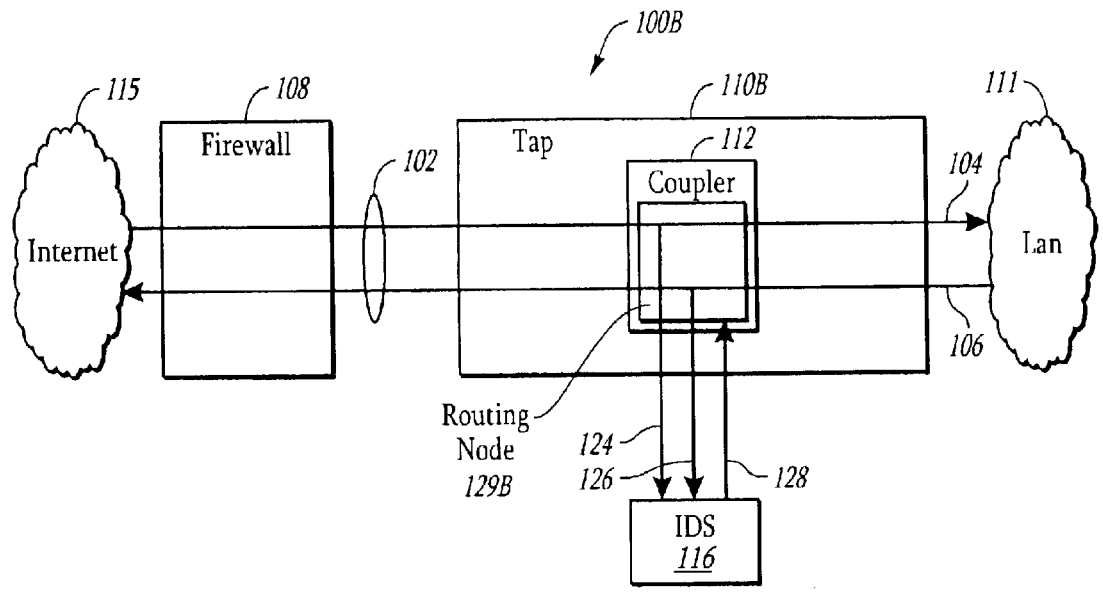
FIG. 2B illustrates a block diagram of another embodiment of the security tap of the present invention.

FIG. 2B illustrates a second embodiment of a system 100B incorporating a security tap 110B. In the embodiment of FIG. 2B, routing node 129B is disposed over the node at the intersection of all of the communication lines associated with coupler 112. That is, routing node 129B is in communication with communication lines 104, 106, 124, 126 and 128. Routing node 129B functions to control the flow of data packets between communication line 106 and communication line 128. In addition, because routing node 129B is disposed over the other communication lines, routing node 129B can be programmed to control, modify, or analyze the data of any communication line within security tap 110B. Details regarding this embodiment are disclosed below in reference to FIGS. 3 and 5A.

FIG. 2B also illustrates that testing equipment 118 is not necessary in order to practice features of the present invention. As illustrated in FIG. 2B, system 100B comprises a security tap 110B that is connected to an intrusion detection system 116 but not additional testing equipment. Thus it will be appreciated that the sole function of security tap 110B may be to facilitate the use of an intrusion detection system, without other functionality.

Figure 2C:
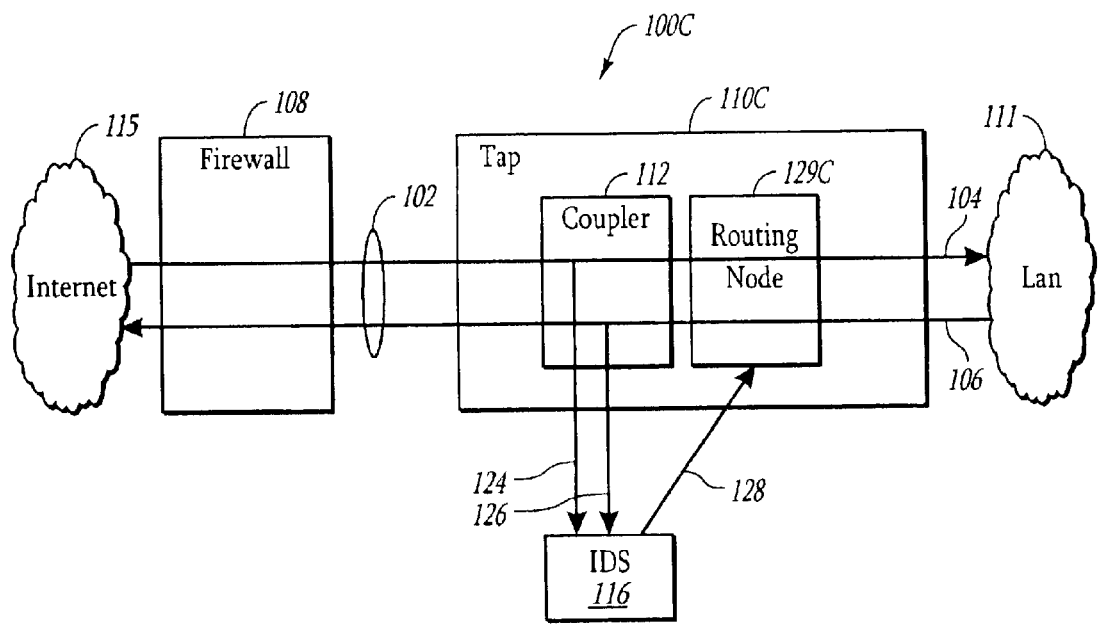
FIG. 2C illustrates a block diagram of yet another embodiment of the security tap of the present invention.

FIG. 2C illustrates another embodiment of system 100C comprising a security tap 110C. In the embodiment of FIG. 2C, coupler 112 is distinct from routing node 129C. Routing node 129C is positioned at the node of the intersection of 104, 106 and 128. Routing node 129C implements functionality to control the flow of data between communication line 106 and communication line 128. In addition, routing node 129C has access to the flow of data in communication line 104. As such, it will be appreciated that the functions of routing node 129C may control, modify, or analyze the data on other junctions in security tap 110C. It will be appreciated that this additional circuitry within security tap 110C allows security tap 110C to have additional functionality not available in prior art taps, including the native ability to perform some analysis of network data and reporting of statistics associated with the network data.

Figure 2D:
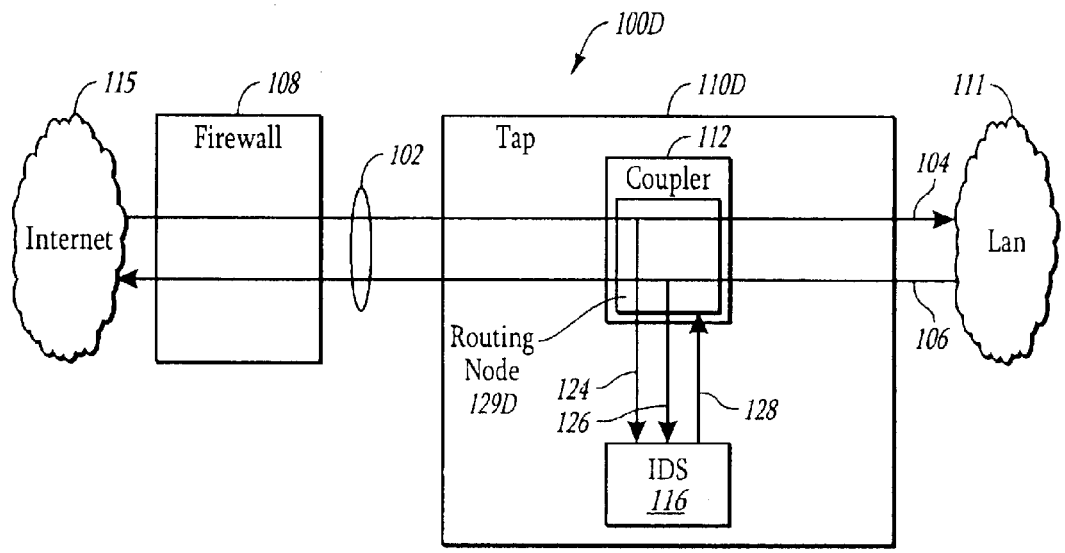
FIG. 2D illustrates a block diagram of still another embodiment of the security tap of the present invention.

FIG. 2D illustrates an embodiment of a system 100D with a security tap 110D. In the embodiment of FIG. 2D, security tap 110D incorporates intrusion detection system 116 as an integrated hardware. That is, communication lines 124, 126 and 128 are not external of security tap 110D. While this embodiment is similar to the embodiment of security tap shown in FIG. 2B, it will be appreciated that such an embodiment may also operate according to the embodiments illustrated in FIG. 2A or 2C. Advantageously, security tap 110D dispenses with additional connections and hardware, requiring only ports to connect security tap 110D to main communication line 102. In addition, because routing node 129D is disposed over other junctions of communication lines 102, 124, 126 and 128, routing node 129D may be programmed to have other functionality for controlling, modifying or analyzing data flow in communication lines 102, 124, 126 and 128. In this embodiment, the security tap and the intrusion detection system are integrated into a single device. Integration in this manner may decrease the flexibility of both the security tap and the intrusion detection system, but may also simplify the use and installation of the intrusion detection system.

Figure 2E:
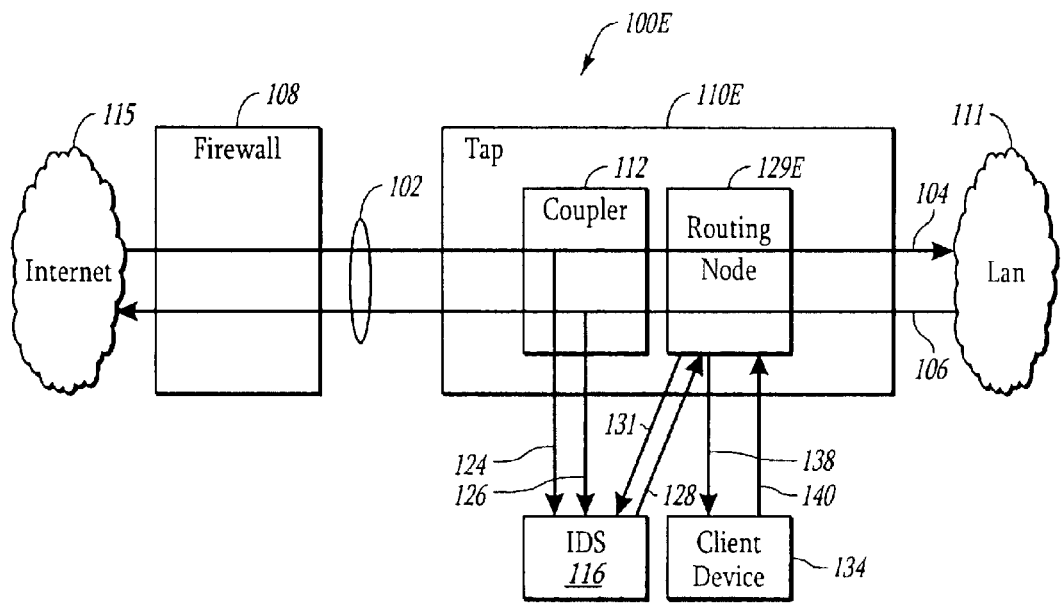
FIG. 2E illustrates a block diagram of another embodiment of the security tap of the present invention.

FIG. 2E illustrates a system 100E incorporating another embodiment of security tap 10E. In the embodiment of FIG. 2E, security tap 110E comprises a separate coupler 112 and routing node 129E, similar to that shown in FIG. 2C. Intrusion detection system 116 is connected to routing node 129E through communication line 128. Communication line 128 is coupled to outgoing communication line 106 to allow information to be sent to firewall 108. In addition, another communication line 131 connects intrusion detection system 116 to routing node 129E. Communication line 131 is coupled to incoming communication line 104. As such, it will be appreciated that routing node 129E is able to transmit information from intrusion detection system 116 to other nodes of the local area network 111.

Routing node 129E is also connected to a client device 134 through a communication line 138 and 140. In the embodiment of FIG. 2E, routing node 129E is programmable to allow security tap 110E to control, modify, or analyze data flow in communication line 102. Client device 134 may be any hardware device having an application thereon that allows a user to program routing node 129E. For example, client device 134 may be a personal computer, a laptop computer, a hand-held personal data assistant (PDA), a cellular telephone, a notepad, a dedicated programming device designed specifically for programming the routing node 129E, and the like.

Accordingly, routing node 129E can be programmed with additional functionality. For example, in addition to transmitting information between intrusion detection system 116 and firewall 108, security tap 110E can be used as a network analyzer or a jammer. It will be appreciated that any of the embodiments of security tap 110 illustrated in FIGS. 2A through 2D may be modified to connect to an external client device 134 to upgrade or program the routing node 129.

2. Embodiments of Circuitry and Components of Security Taps

Figure 3:
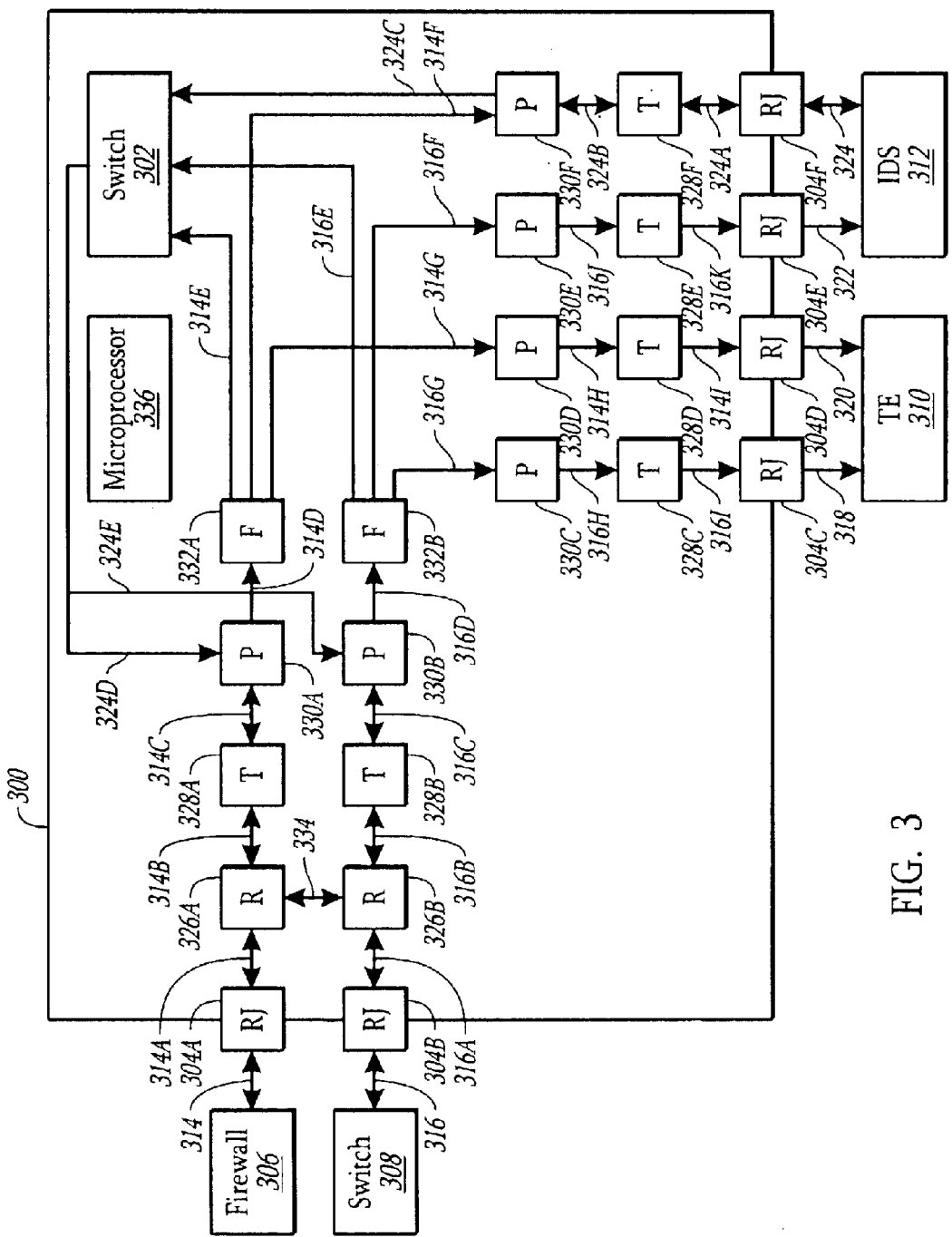
FIG. 3 illustrates a block diagram of a security tap of the present invention implementing an Ethernet switch to allow an intrusion detection system to send information into the security tap.

With reference to FIG. 3, a security tap 300 is shown incorporating a routing node. In the embodiment of FIG. 3, the routing node is an Ethernet switch 302. Security tap 300 also incorporates a microprocessor 336, which may be a programmable integrated circuit (PIC), which is a single-chip microcontroller. Alternatively, the microprocessor can be a field a, programmable gate array (FPGA). Switch 302 is configured to direct data packets flowing through security tap 300, routing the data packets to their correct destination. Microprocessor 336 is configured to control switch 302 and other components of security tap 300 as will be discussed in more detail below.

Security tap 300 is configured to tap data carried by primary communication lines or a network cable, represented in FIG. 3 by communication lines 314, 316. Security tap 300 is configured with ports 304A, 304B, which enable security tap 300 to be connected to the primary communication lines using, for example, RJ-45 connectors. A firewall 306 and network switch 308 are in communication with the primary communication lines 314, 316, respectively. Thus, in reference to the network description provided in FIG. 2, information flows through the main communication lines 314 and 316 from the Internet, through firewall 306, then through security tap 300, and finally to switch 308, which directs the data packets to the appropriate destinations in the local area network, and the data also can flow in the reverse direction from the local area network to the Internet.

Security tap 300 also includes ports 304C through 304F that enable security tap 300 to be connected to testing equipment 310 and an intrusion detection system 312, through communication lines 318, 320, 322, 324, respectively. Various commercially-available intrusion detection devices exist, substantially any of which can be used with the security taps of the invention. Moreover, substantially any testing equipment that require non-intrusive access to network data can be used with the security taps of the invention.

Ports 304A through 304F may be any port configuration that provides a suitable communication line connection to security tap 300. In embodiments where the communication lines consist of conductive metallic wires, ports 304A through 304F may be RJ-45 connections. As is known in the art, RJ-45 connections can be configured for connection to Ethernet cables. In the drawings accompanying this specification, the label "RJ" is used to represent an RJ-45 connection. Because RJ-45 cables support full duplex communication, a pair of RJ-45 ports connects the main communication line, represented by numerals 314 and 316, to the security tap. However, in embodiments where the main communication line uses optical fibers, security tap 300 may use two connectors to connect with the firewall 306 and two additional connectors to connect with the switch 308. Thus, in embodiments for optical fiber communication lines, it will be understood that ports 304A through 304F (or any other port illustrated) may be modified to have a "transmit" port and a "receive" port to allow the communication line to be connected thereto. The type of connection for ports 304A through 304F may be configured depending on design requirements.

That is, the main communication cable can be viewed as a first segment 314 and a second segment 316 which allows uninterrupted bi-directional data flow between firewall 306 and switch 308. When network tap 300 is connected, first segment 314 and second segment 316 must be physically severed to allow network tap 300 to be disposed therebetween. When first segment 314 and second segment 316 are connected to network tap 300, a complete data circuit is formed, re-establishing the uninterrupted, bi-directional data flow between firewall 306 and switch 308. Ports 304A and 304B enable the connection of first segment 314 and second segment 316 of the main communication cable to security tap 300, respectively.

Figure 4A:
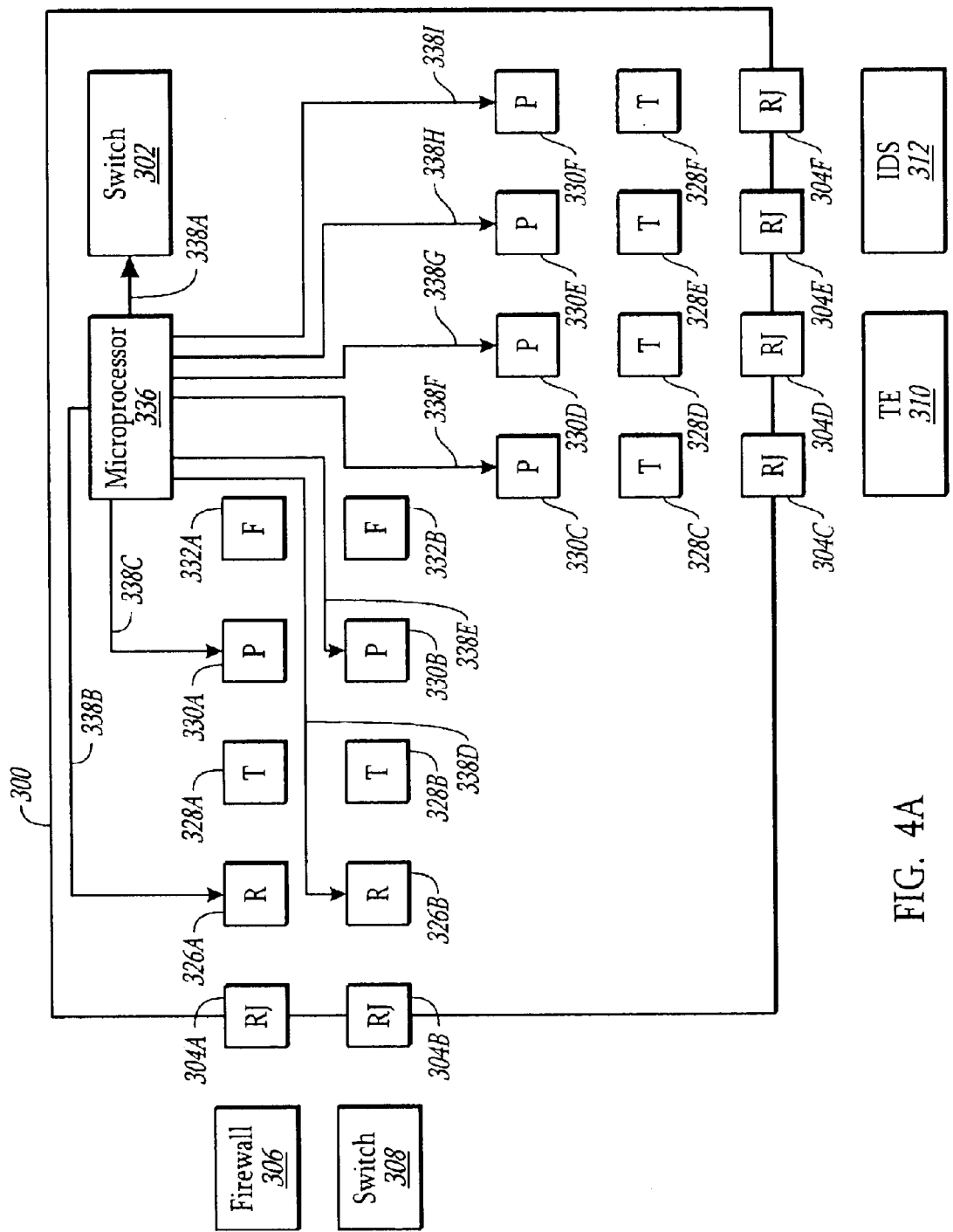
FIG. 4A illustrates a block diagram of the security tap of FIG. 3, illustrating a microprocessor to control components of the security tap.
Figure 4B:
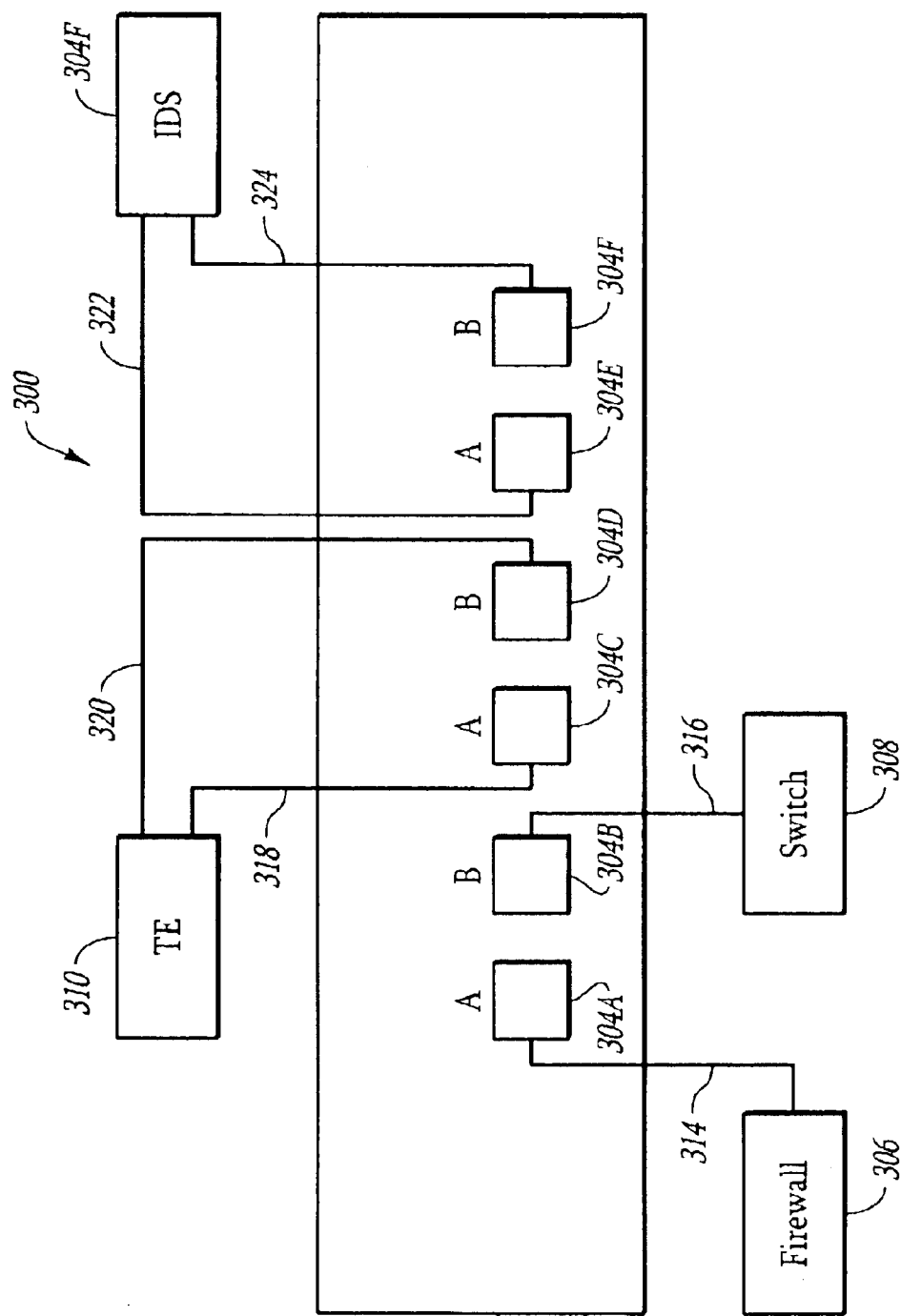
FIG. 4B illustrates an exemplary hardware configuration for a security tap configured to connect to metal communication lines in accordance with an embodiment of the present invention.

FIG. 4B illustrates an exemplary hardware configuration for connecting a metallic conductive wire communication line to security tap 300. That is, port 304A is connected to firewall 306 through communication line 314 and port 304B is connected to switch 308 through communication line 316. In addition, ports 304C, 304D are connected to testing equipment 310 through communication lines 318, 320, and ports 304E, 304F are connected to intrusion detection system 312 via ports 322, 324. Note that ports 304C, 304D, 304E allow uni-directional data flow while port 304F allows bi-directional data flow.

Figure 4C:
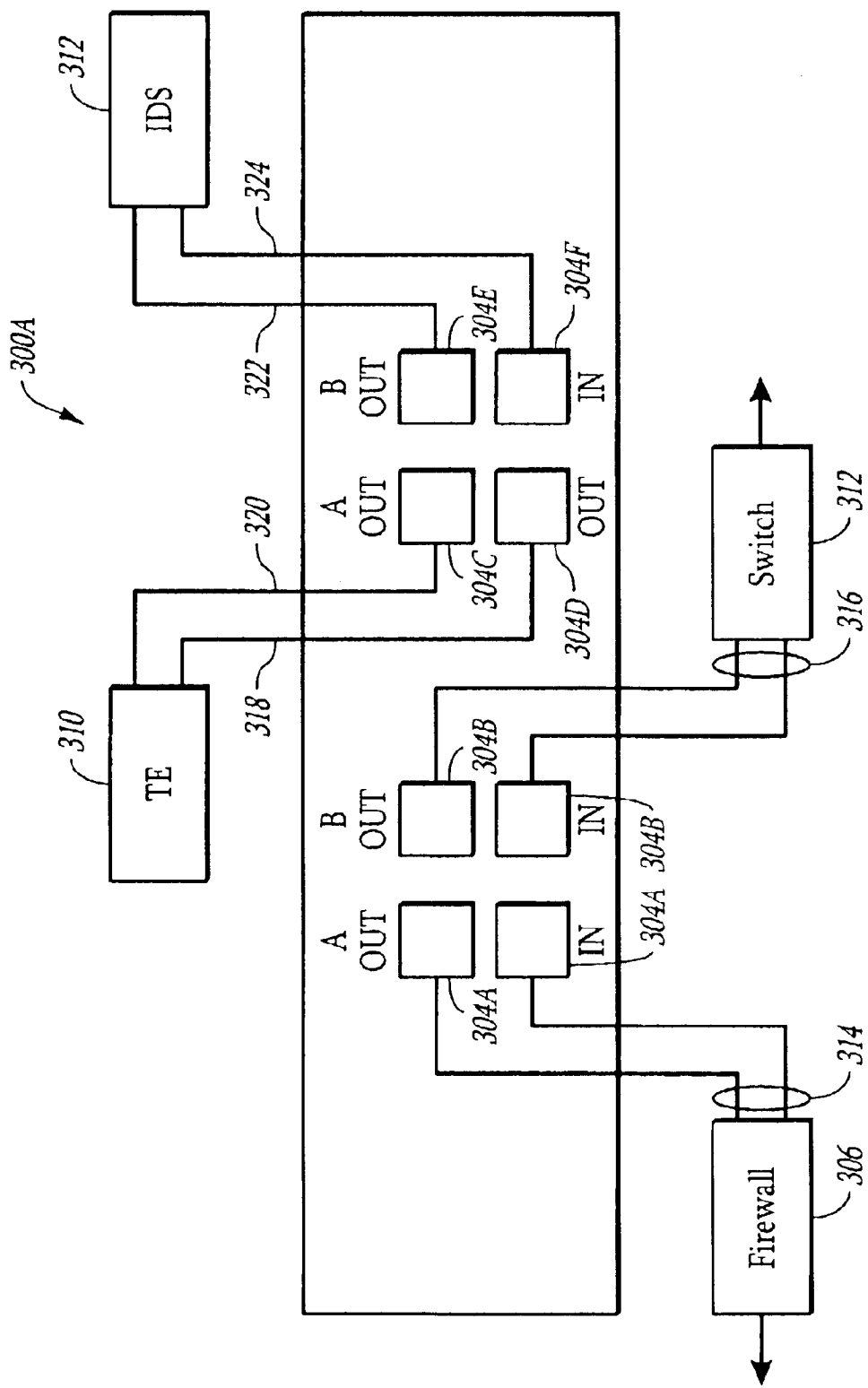
FIG. 4C illustrates an exemplary hardware configuration for a security tap configured to connect to optical fibers in accordance with an embodiment of the present invention.

In contrast, FIG. 4C illustrates an exemplary hardware configuration for connecting an optical fiber communication line to security tap 300. In this embodiment, port 304A is modified to have an IN or "transmit" port and an OUT or "receive" port which connects to firewall 306 through communication line 314. Note that communication line 314 is represented by two optical fibers, one representing ingoing data flow, the other representing outgoing data flow. Port 304B is modified to have an IN port and an OUT port which connects to firewall 308 through communication line 316 (again, with communication line 316 being represented by distinct optical fibers). Ports 304C, 304D are modified to have two OUT ports which allow for uni-directional data flow to testing equipment 310. Ports 304E, 304F are modified to connect to intrusion detection system 312, with port 304E allowing uni-directional data flow and port 304F allowing bi-directional data flow.

Continuing the description of security tap 300 with reference to FIG. 3, ports 304A, 304B are connected to relays 326A, 326B via communication lines 314A, 316A, respectively. Relays 326A, 326B send the information to transformers 328A, 328B through communication lines 314B, 316B, respectively. If there is no system power at the security tap, relays 326A, 326B transmit the data directly to each other via communication link 334. Thus, the data link through the security tap is operational even if the power supply is lost or disabled.

In one preferred embodiment, transformers 328A, 328B provide the isolation and common mode filtering required to support category 5 UTP cables for use in Ethernet 10/100/1000Base-T duplex applications. Information flows from transformers 328A, 328B to physical layer devices 330A, 330B through communication lines 314C, 316C, respectively. Physical layer devices ("PHYs") 330A, 330B convert the electrical signals into a desired format which is compatible with the signal's intended destination. For example, physical layer devices 330A, 330B convert the signal to a format which is compatible with switch 302. The data from physical layer devices 330A, 330B are sent to fan out buffers 332A, 332B by communication lines 314D, 316D, respectively.

Fan out buffers 332A, 332B, enable the data packets to be duplicated and sent to multiple destinations. Fan out buffer 332A sends data packets to switch 302 and physical layer devices 330D, 330F through communication lines 314E, 314F, 314G, respectively. Similarly, fan out buffer 332B sends data packets to switch 302 and physical layer devices 330C, 330E through communication lines 316E, 316F, 316G, respectively. Communication lines 324E, 324D connect switch 302 to physical layer devices 330B, 330A, respectively. Thus, it will be appreciated that a complete data path is formed between firewall 306 and Ethernet switch 308. That is, data flowing from firewall 306 flows through the path formed by communication lines 314A, 314B, 314C, 314D, 314E, 324E, 316C, 316B and 316A. Similarly, data flowing from Ethernet switch 308 flows through the path formed by communication lines 316A, 316B, 316C, 316D, 316E, 324D, 314C, 314B and 314A.

Physical layer devices 330C through 330F are connected to transformers 328C through 328F by communication lines 316H, 314H, 316J, 324B, respectively. Transformers 328C through 328F are, in turn, are connected to ports 304C through 304F through communication lines 316I, 314I, 316K, 324A, respectively. Testing equipment 310 is connected to ports 304C, 304D by communication lines 318, 320, respectively. In addition, intrusion detection system 312 is connected to ports 304E, 304F by communication lines 322, 324, respectively. Finally, physical layer device 330F is connected to switch 302 via communication line 324C. In one embodiment, physical layer devices may be a transceiver such as the Alaska® Quad Gigabit Ethernet Transceiver manufactured by Marvell located in Sunnyvale, Calif.

As shown in FIG. 3, communication lines 314, 316 and 324 allow bi-directional data flow therethrough. In addition, communication lines 314A, 314B, 314C, 316A, 316B, 316C, 324A and 324B allow bi-directional data flow therethrough. These bi-directional communication lines are illustrated in FIG. 3 with a single line, although physically these lines are embodied using several pairs of conductors. In contrast, communication lines 318, 320 and 322 allow uni-directional data flow therethrough. In addition, communication lines 314D through 314I, 316D through 316K, 324C, 324D and 324E also allow uni-directional data flow therethrough. In FIG. 3, bi-directional data flow is indicated by a double-headed arrow while uni-directional data flow is indicated by a single-headed arrow.

In operation, data flows between firewall 306 and Ethernet switch 308 as described above. If there is a loss of power to security tap 300, the data is routed through communication line 334 so that data is not lost. At fan out buffers 332A, 332B, the signal on which the data packets are encoded is split or duplicated so that a representation of the data flowing between firewall 306 and Ethernet switch 308 can be sent to testing equipment 310 and intrusion detection system 312 to be monitored. That is, data packets are sent from fan out buffers 332A, 332B to physical layer devices 330C through 330F. These data packets are sent to testing equipment 310 and intrusion detection system 312. Data packets from fan out buffers 332A, 332B are also sent to switch 302.

As illustrated in FIG. 3, port 304F allows bi-directional flow of data therethrough. Where switch 302 is an Ethernet switch, port 304F is configured to accept Ethernet traffic generated by intrusion detection system 312. Port 304F is thus configured to receive various types of device data from the attached device, intrusion detection system 312. Device data may be instructions from the attached device, messages to be sent to other components of the network, or, in this particular application, a control signal in the form of one or more kill packets. When intrusion detection system 312 identifies intrusive activity, it sends a kill packet through port 304F to transformer 328F and to physical layer device 330F. The kill packet is sent from physical layer device 330F through communication line 324C to switch 302. The kill packet contains header information such that Ethernet switch 302 directs the data packet to firewall 306. That is, the kill packet is sent via communication line 324D to physical layer device 330A which is in the data flow path of firewall 306. The kill packet sent from intrusion detection system 312 instructs firewall 310 to prohibit further data flow from the intrusive source.

The kill packet can also be addressed to another network node in the local area network, in which case, switch 302 also directs the kill packet to the other designated node. When an intrusion is detected, another kill packet is sent to switch 308 to prevent further intrusions through the other network node into the local area network. This second kill packet can be sent at substantially the same time as the first kill packet so that both ends of the main communication cable are protected from the intrusion.

It will be appreciated that Ethernet switch 302 represents a hub for data packets coming from firewall 306, switch 308 and intrusion detection system 312. Ethernet switch 302 examines the destination address in the header of each data packet and sends the data packet to the corresponding port. Thus, Ethernet switch 302 prevents the collision of data by coordinating data flow therethrough. The process by which Ethernet switches 302 direct the flow of data is well known in the art. A suitable Ethernet switch is the Scalable 12-Port Gigabit Ethernet MultiLayer Switch manufactured by Broadcom located in Irvine, Calif. Because switch 302 is connected to both physical layer devices 330A, 330B by communication lines 324E, 324D, information may be sent from intrusion detection system 312 to switch 308. This may be desirable, for example, where intrusion detection system 312 sends information regarding the intrusive source to be logged in the network system.

FIG. 4A depicts security tap 300 and a configuration for controlling components of the security tap. Microprocessor 336 is configured to control switch 302, physical layer devices 330A through 330F, and relays 326A, 326B as indicated by control lines 338A through 3381. Microprocessor 336 may comprise a microchip with integrated circuitry configured to control these components.

In one embodiment, microprocessor 336 is configured to control the ability of switch 302 to allow incoming data from intrusion detection system 312. Essentially, this provides security tap 300 with an "enable" or "disable" mode—in the "enable" mode, backflow data from intrusion detection system 312 is allowed; in the "disable" mode, switch 302 does not accept data transmissions from intrusion detection system 312. Thus, security tap 300 may include a manual switch or another user interface for enabling a user to enable/disable the bi-directional communication between security tap 300 and intrusion detection system 312. This may be advantageous, for example, where the user desires to substitute the intrusion detection system with other testing equipment. The enable/disable feature may be applied to any embodiment disclosed herein. The enable/disable feature is further discussed in detail with respect to FIG. 9A. The microprocessor 336 may be configured to control other components of security tap 300 other than those illustrated in FIG. 4A.

Different types of signaling formats may be used in security tap 300. For example, signals between ports 304A through 304G and physical layer devices 330A through 330G may be transmitted in Media Dependent Interface (MDI) format. Signals between one physical layer devices to another physical layer device may be transmitted in Serial Gigabit Media Independent Interface (SGMII) format which consist of serial 1.25 GHz encoding. In addition, microprocessor 336 may communicate with physical layer devices 330A through 330F using SGMII format. Those skilled in the art will recognize that other configurations may be used depending on design considerations. In addition, other signal formats may be implemented.

Figure 5A:
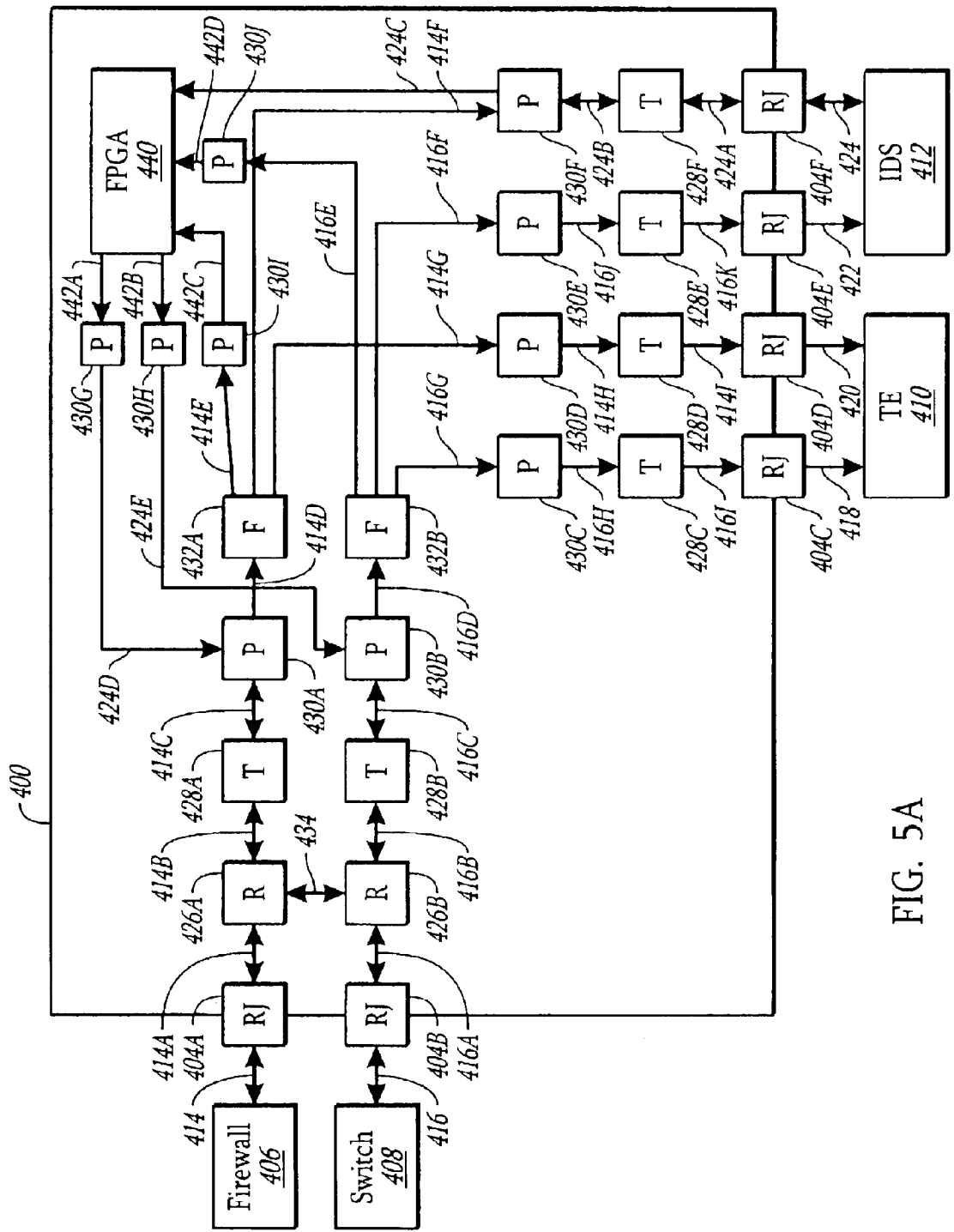
FIG. 5A illustrates a block diagram of a security tap of the present invention implementing an FPGA to allow an intrusion detection system to send information into the security tap.

FIG. 5A illustrates a security tap 400 incorporating an alternative routing node. In the embodiment of FIG. 5A, the routing node is a Field Programmable Gate Array (FPGA) 440. An FPGA is an integrated circuit which is controlled using programmable code. FPGA 440 can be programmed to coordinate the flow of data from an intrusion detection system 412 to a firewall 406. Many of the elements in FIG. 5A are similar to the elements in FIG. 3. As such, like elements are referred to with like reference numerals, substituting 300's for 400's. Thus, a detailed description of security tap 400 will not be provided, except where new reference numbers are introduced.

The primary difference between FIG. 3 and FIG. 5A is that FPGA 440 now acts as the router for data flow between firewall 406, Ethernet switch 408, testing equipment 410 and intrusion detection system 412. FPGA 440 is connected to a plurality of physical layer devices 430G through 430J through communication lines 442A through 442D, respectively. Advantageously, FPGA 440 provides circuitry which can be preprogrammed to perform certain functions. Alternatively, as will be discussed further below, FPGA 440 can be programmed by an external source after the security tap 400 has been deployed in a network.

As illustrated in FIG. 5A, data is allowed to flow in a continuous circuit between firewall 406 and Ethernet switch 408 through FPGA 440. In addition, intrusion detection system 412 is able to send data packets through FPGA 440, which can then be directed to firewall 406 or other components of security tap 400 without the data colliding with other data flowing through FPGA 440.

Figure 5B:
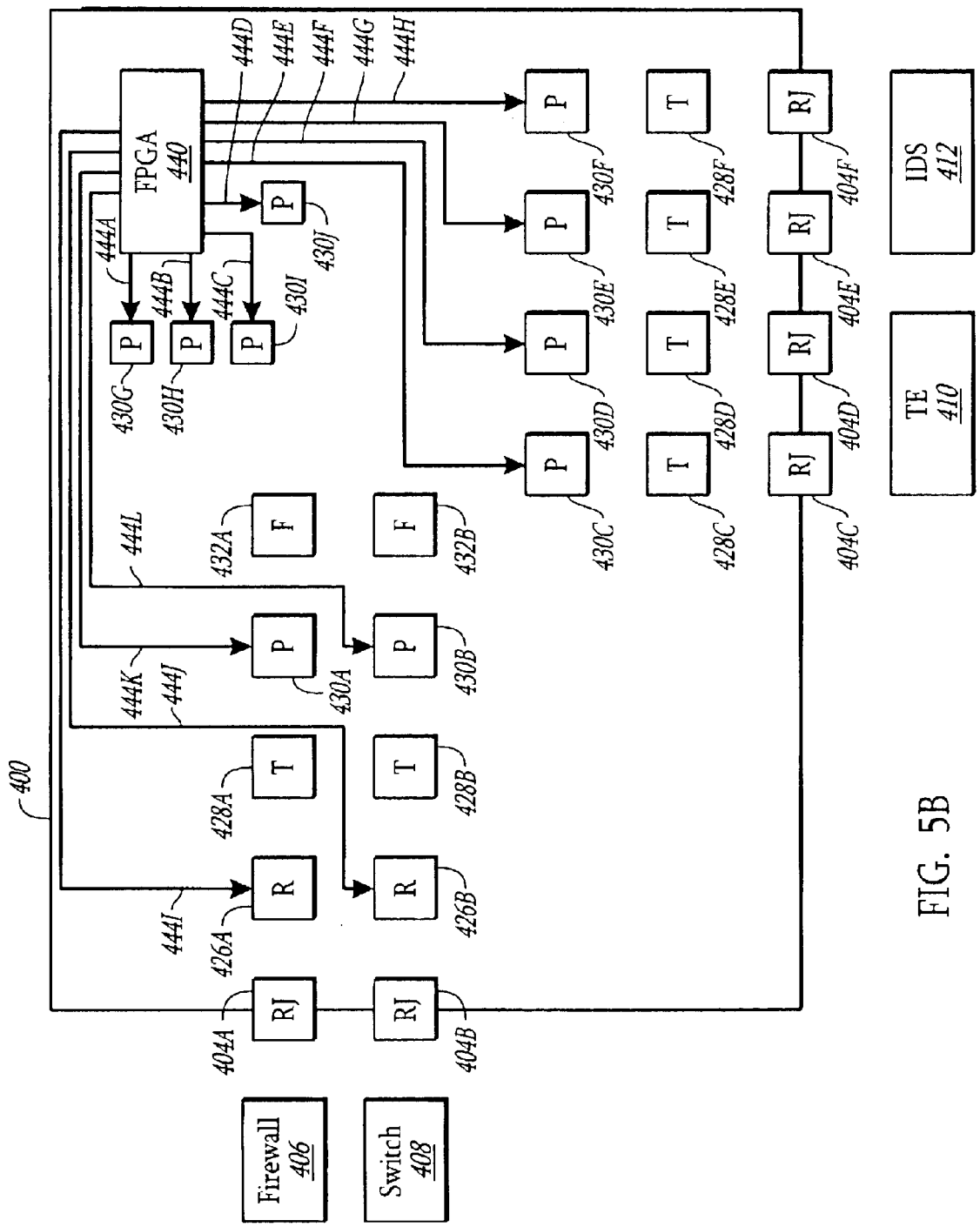
FIG. 5B illustrates a block diagram of the security tap of FIG. 5A, illustrating how the FPGA controls components of the security tap.

As depicted in FIG. 5B, in addition to controlling the flow of data therethrough, FPGA 440 also controls physical layer devices 430A through 430J and relays 426A, 426B. Control lines 444A through 444L indicate the connection between FPGA 440 and each of these respective components.

Figure 5C:
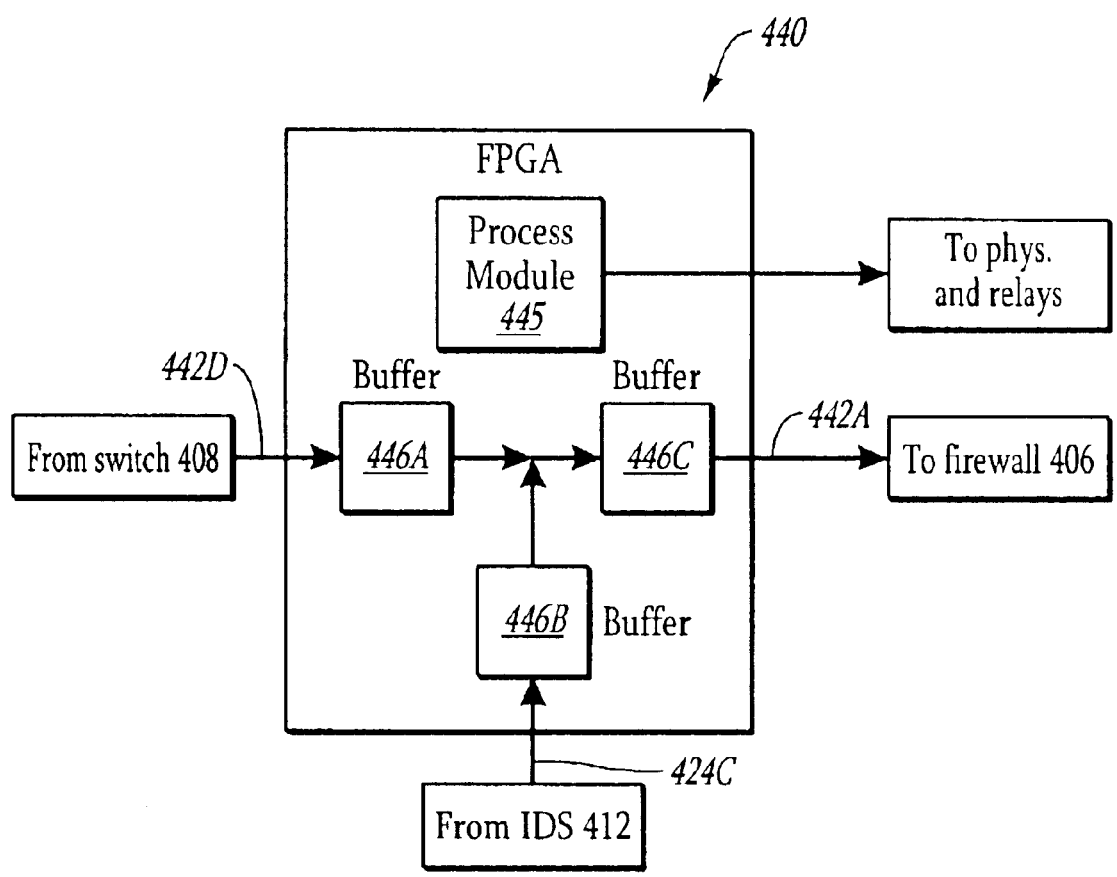
FIG. 5C illustrates a block diagram of the FPGA of FIG. 5A.

FIG. 5C illustrates FPGA 440 in more detail. As shown in FIG. 5C, FPGA 440 is disposed over the junction between communication line 442D containing outgoing information from switch 408 and communication line 424C containing outgoing information from intrusion detection system 412. FIG. 5C only depicts the situation in which information from switch 408 and intrusion detection system 412 may possibly collide. However, as discussed above, FPGA 440 is programmed to route information between firewall 406, switch 408, testing equipment 410 and intrusion detection system 412.

FPGA 440 comprises processing module 445 that is programmed to coordinate the flow of data packets in FPGA 440. FPGA 440 includes buffers 446A, 446B, 446C disposed in communication with communication lines 442D, 424C, 442C, respectively. Buffers 446A, 446B, 446C are configured with cache memories that retain data packets according to the logic in processing module 445. Processing module 445 is programmed with basic logic that coordinates the flow of data packets between buffers 446A, 446B, 446C. In addition, as shown in FIG. 5C, process logic 445 is programmed to control physical layer devices and relays in security tap 400.

Figure 5D:
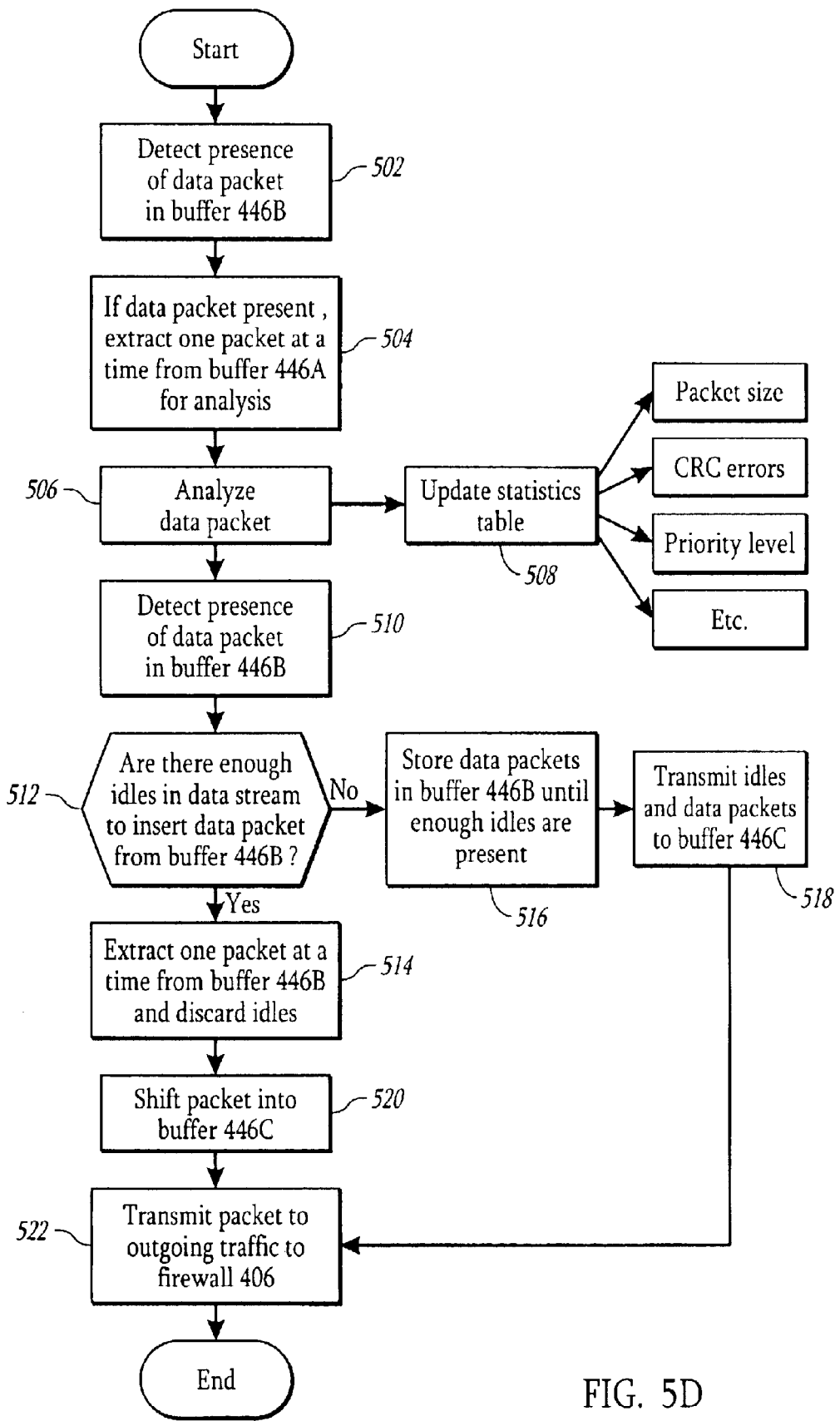
FIG. 5D illustrates a flow diagram of the process logic steps for the FPGA of FIG. 5A.

FIG. 5D illustrates a flow diagram 500 of one example of the process logic steps that can be programmed in FPGA 440. In general, the flow diagram of FIG. 5D illustrates one example of a method of determining when a data packet received from the intrusion detection system and stored in buffer 446B can be safely inserted into the flow of data on the communication line that is connected with the firewall without resulting in corruption of the data otherwise carried on the communication line. The basic criterion is that a data packet (e.g., a kill packet) can be inserted into the data flow at an idle time in the data flow or when only idle data packets are otherwise transmitted on the communication line.

In step 502, FPGA 440 detects the presence of one or more data packets stored in buffer 446A. At step 504, if data packets are present in buffer 446A, FPGA 440 extracts one packet at a time from buffer 446A for analysis. At step 506, FPGA 440 goes through a simple packet analysis, obtaining various statistics relating to the packet. Such statistics may include whether or not the packet is idle, the packet size, CRC errors in the packet, the priority level of the packet, and the like. At step 508, FPGA 440 updates a statistics table which is maintained on all of the packets flowing through FPGA 440.

At step 510, FPGA 440 detects the presence of one or more packets stored in buffer 446B. In addition, FPGA 440 analyzes the one or more packets for idle packets. While not shown, FPGA 440 may also do a packet analysis on packets stored in buffer 446B. At step 512, FPGA 440 determines whether enough idle packets have passed through buffer 446A to allow data packets from buffer 446B to be inserted into communication line 442D. At step 514, if there are enough idle packets to insert data packets from buffer 446B, FPGA 440 extracts one packet at a time from buffer 446B and discards or overwrites the idle packet. At step 520, FPGA 440 shifts the packet into buffer 446C. At step 522, FPGA 440 transmits the packet into outgoing traffic directed to firewall 406. Thus, intrusion detection system 412 is allowed to transmit information through security tap 400.

At step 516, if there are not enough idle packets to insert data packets from buffer 446B, then buffer 446B stores the data packets from intrusion detection system 412 until enough idles are determined by step 512. At step 518, FPGA 440 prepares the idle and/or data packet to be transmitted to buffer 446C. That is, FPGA 440 waits until the entire packet is loaded and ready. At step 522, the packet is transmitted to outgoing traffic directed to firewall 406. The foregoing is merely one example of an exemplary process logic that FPGA 440 could be programmed to perform. Other process logic steps may be used depending on design considerations.

In an alternative method, the data packets stored in buffer 446A are analyzed only when it is first determined that there is a data packet in buffer 446B that needs to be inserted into the data flow on the communication line. In normal operation, the presence of a data packet in buffer 446B is quite infrequent, since these data packets are typically kill packets that are generated in response to a determination that an intrusion may be underway.

Figure 6A:
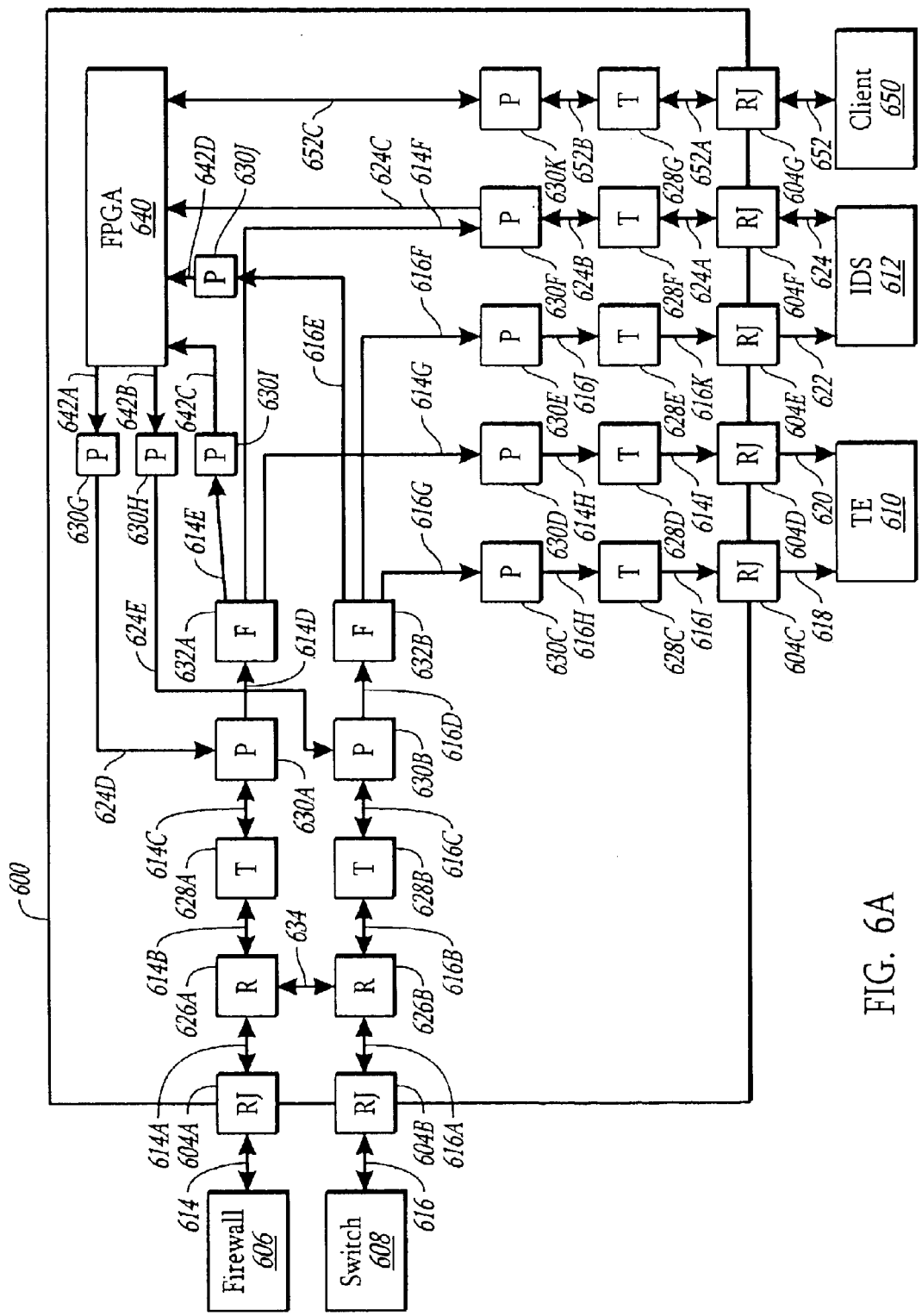
FIG. 6A illustrates a block diagram of a security tap of the present invention illustrating an FPGA to allow an intrusion detection system to send information into the security tap and illustrating a client device for upgrading the FPGA.

With reference to FIG. 6A, another embodiment of a security tap 600 is illustrated. Many of the elements in FIG. 6A are similar to the elements in FIG. 5A. As such, like elements are referred to with like reference numerals, substituting 600's for 400's. Thus, a detailed description of security tap 600 will not be provided, except where new reference numbers are introduced.

The most significant difference between security tap 600 and security tap 400 is that security tap 600 has a connection between FPGA 640 and a client device 650. Client device 650 may be any suitable programming device as described above. In further detail, client device 650 connects to a port 604G through communication line 652. Port 604G connects to transformer 628G via communication line 652A. Transformer 628G connects to a physical layer device 630K via a communication line 652B.

Figure 6B:
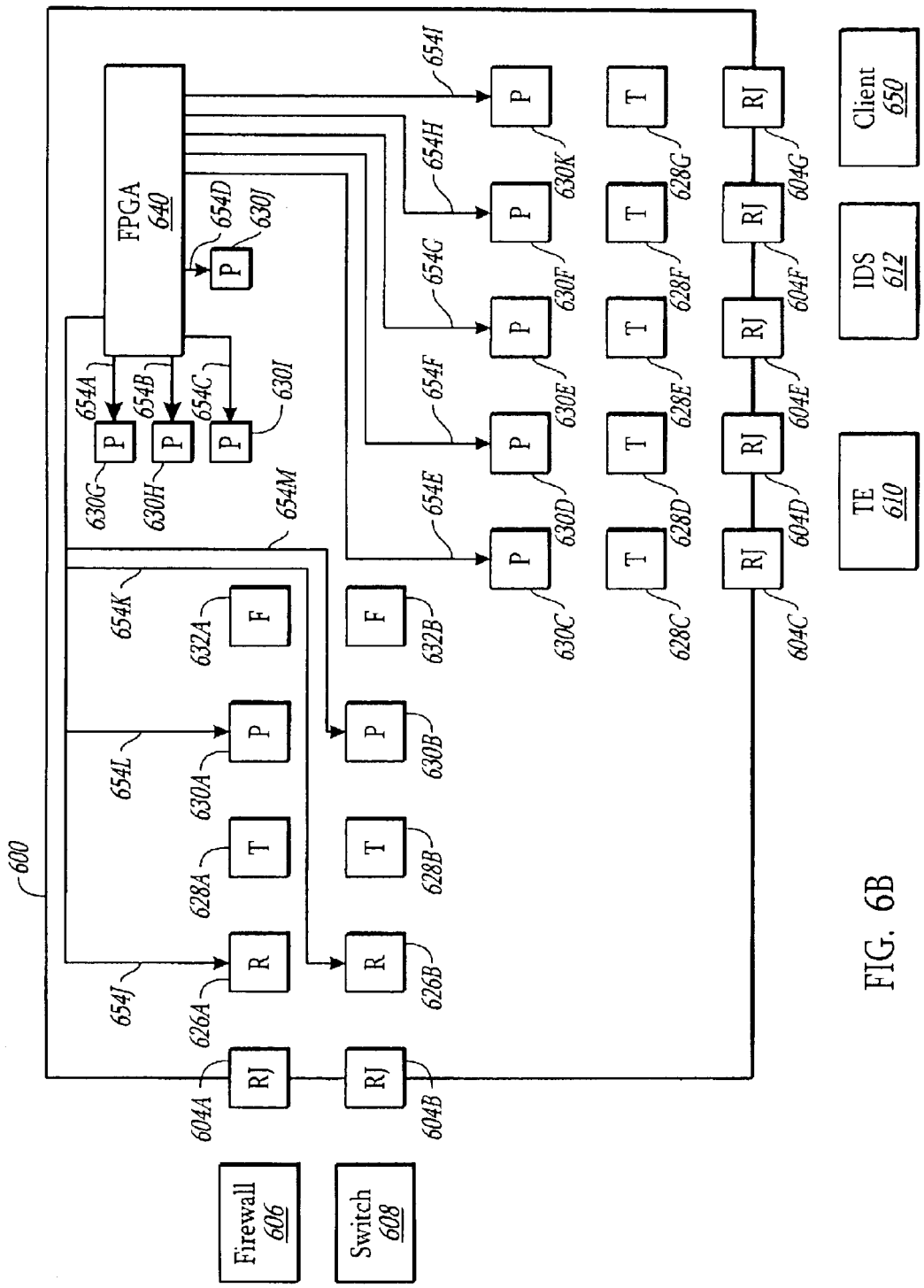
FIG. 6B illustrates a block diagram of the security tap of FIG. 6A, illustrating how the FPGA controls other components of the security tap.

Thus, FPGA 640 operates to coordinate the flow of data from intrusion detection system 612 to firewall 606 and/or other components of security tap 600. Because the elements between FIGS. 5A and 6A are similar, the process logic for the FPGA discussed with respect to FIG. 5C also applies to FPGA 640. That is, the steps that FPGA 640 uses to coordinate the flow of data packets between intrusion detection system 610 and firewall 608 may be similar to the steps illustrates and discussed with respect to FIG. 5C. Alternatively, other process logic flow may be used to produce the same functionality. In addition, as depicted in FIG. 6B, FPGA 640 controls the operation of physical layer devices 630A–630K and relays 326A, 326B as indicated by control lines 654A–654M.

Furthermore, the connection between FPGA 640 and client device 650 allows exchange of information therebetween. In particular, FPGA 640 is allowed receive and transmit communication through an external source, client device 650. Client device 650 comprises client software which allows a user to program FPGA 640 externally. FPGA 640 may thus be programmed to control physical layer devices, relays, or other components of security tap 600. In addition, FPGA 640 may be programmed to add or alter functionality of the FPGA. For example, in one embodiment, FPGA 640 can be programmed to collects certain statistical information on the data flow in security tap 600 and to transmit those statistics to client device 650. As such, it will be appreciated that FPGA 640 is provided with additional functionality, not possible in the security tap of FIG. 5A. Port 604G may thus be properly termed a "management port."

The client device 650 can be either local with respect to security tap 600 or can be remote, with communication being established using the Internet or a private network. Client device 650 allows FPGA 640 to be reprogrammed at the location where security tap 600 is connected to the network instead of having to disconnect security tap 600 from the network to reprogram or replace the security tap. Those skilled in the art will recognize that client device 650 will give security tap 600 an IP address for purposes of network configurations. Where prior art taps were not detectable by network monitoring devices, some embodiments of security taps of the present invention will be recognizable.

Figure 6C:
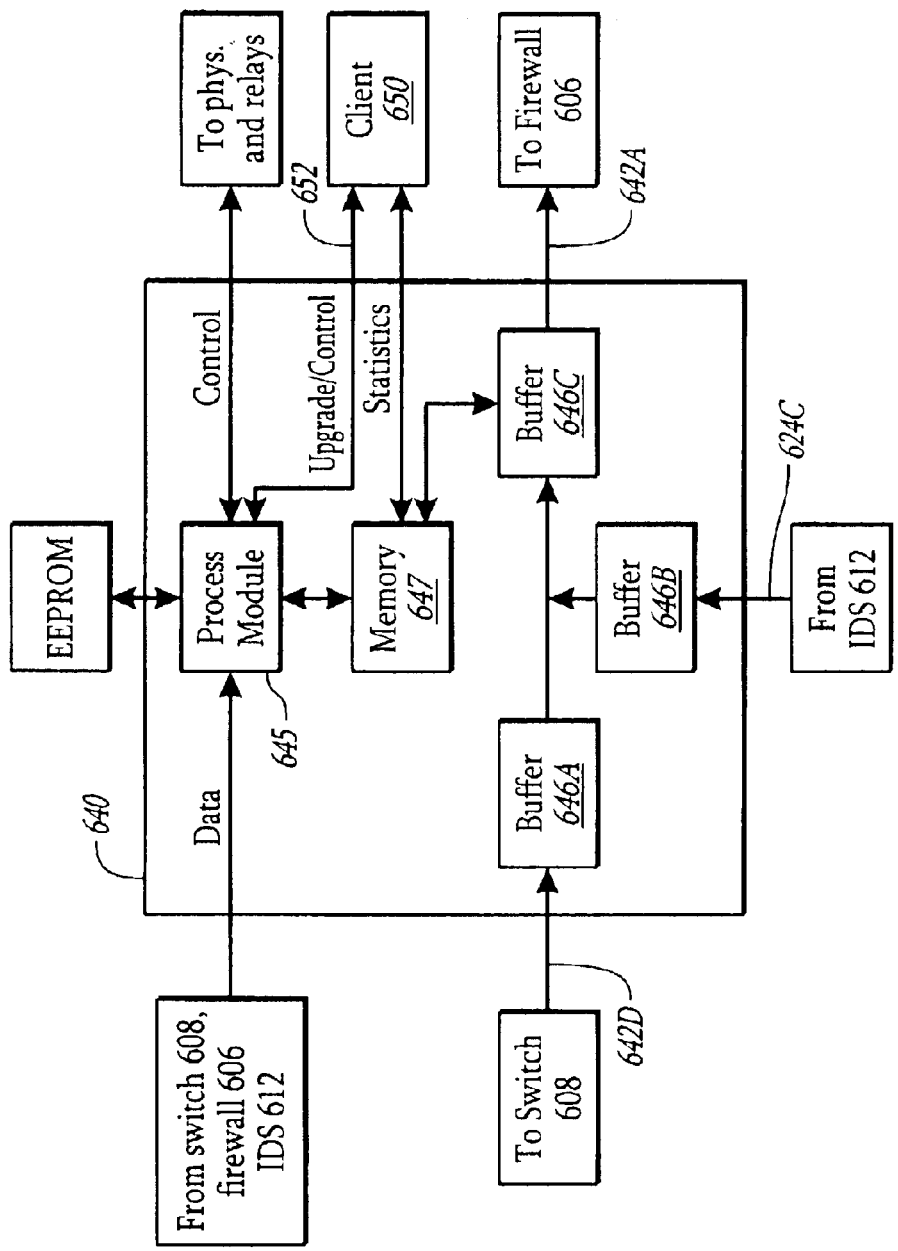
FIG. 6C illustrates a block diagram of the FPGA of FIG. 6A.

With reference to FIG. 6C, a block diagram of FPGA 640 is illustrated. FPGA 640 comprises a process module 645 that is programmed to operate FPGA 640. FPGA also comprises buffers 646A, 646B, 646C that coordinate the flow of data from intrusion detection system 612 to firewall 606. As discussed above, FPGA 640 operates to coordinate the flow of data therethrough. Buffers 646A, 646B and 646C operate in conjunction with process module 645 in a manner that is substantially similar to that described with reference to FIG. 5C.

In addition, FPGA 640 comprises a memory 647. Process module 645, memory 647 and buffer 646 operate together to extract data from the security tap 600 and deliver information to client device 650 upon request. That is, information enters FPGA 640 from firewall 606, switch 608 and intrusion detection system 612. Process module 645 analyzes the data and saves relevant statistics regarding the data in memory 647. Upon request from client device 650, statistics saved in memory 647 are transmitted to buffer 646C and delivered to client device 650. FIG. 6C also illustrates that FPGA 640 controls components of security tap 600. In particular, process module 645 is connected to physical layer devices and relays to control these elements.

Finally, FPGA 640 is connected to client device 650 in such a way that allows process module 645 to be reprogrammed by an external user. This may be advantageous where a user desires FPGA 640 to have additional functionality than it previously had. Alternatively, client device 650 may delete or alter current functions of FPGA 640.

Figure 7A:
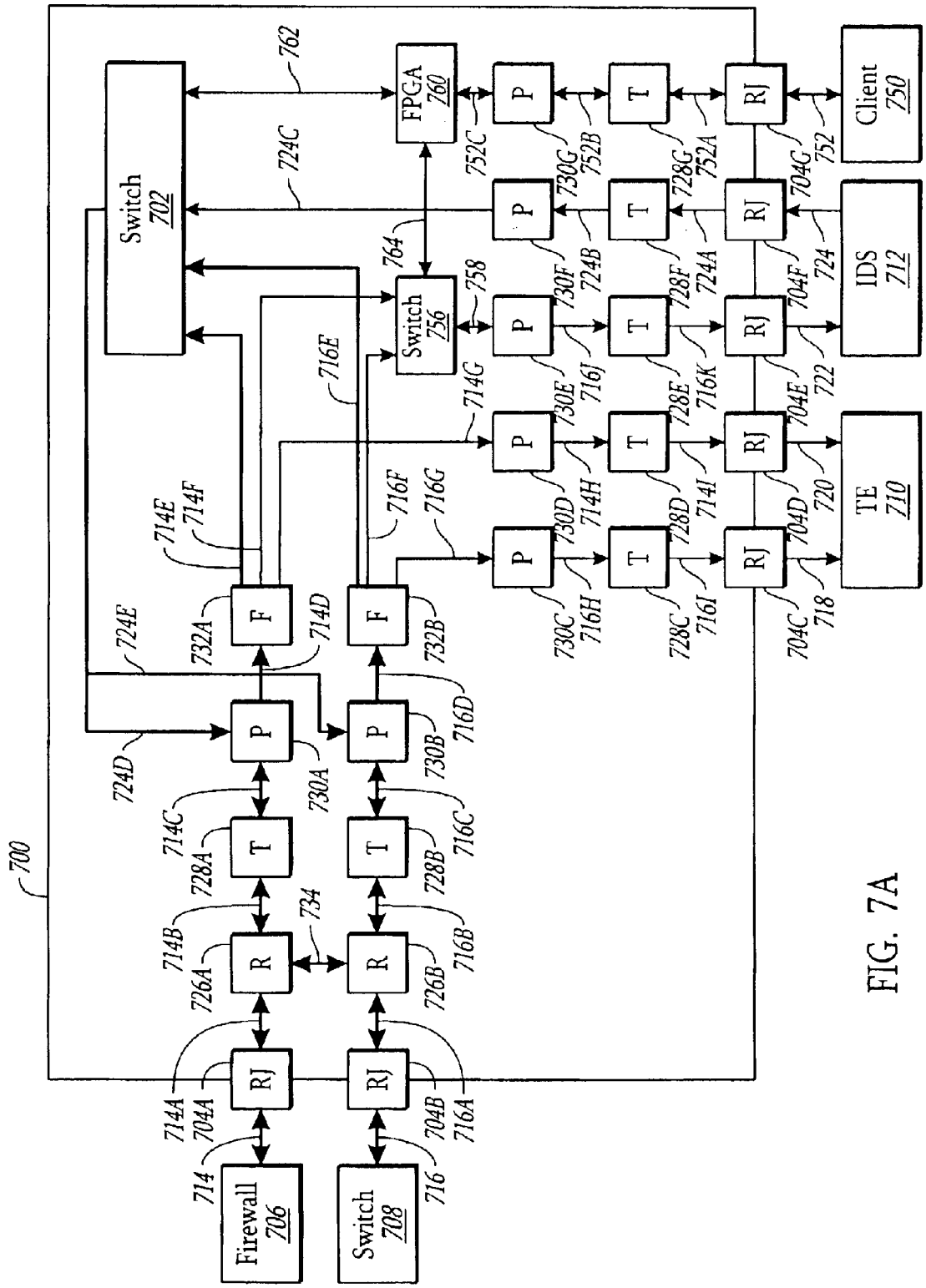
FIG. 7A illustrates a block diagram of a security tap of the present invention implementing an Ethernet switches to allow an intrusion detection system to send information into the security tap, a FPGA to control components of the security tap, and a second switch to streamline the data flow in the intrusion detection system.

With reference to FIG. 7A, an alternative embodiment of a security tap 700 is illustrated. Many of the elements in FIG. 7A are similar to the elements in FIGS. 4A, 5A and 6A. As such, like elements are referred to with like reference numerals, substituting 700's for 300's, 400's and 600's. Thus, a detailed description of security tap 700 will not be provided, except where new reference numbers are introduced.

In the embodiment of FIG. 7A, the routing node is an Ethernet switch 702. In addition, security tap 700 incorporates a combination of FPGAs and Ethernet switches to provide additional functionality. Similar to the embodiment of FIG. 3, a switch 702 is connected to fan out buffers 732A, 732B and physical layer devices 730A, 730B, 730F. As in the embodiment of FIG. 3, switch 702 functions to coordinate the data flow between firewall 706, switch 708 and intrusion detection system 712. Thus, the details of switch 702 may be learned from the discussion of FIG. 3 above. In addition, switch 702 may be configured to collect some information on the data flowing through switch 702.

As depicted in FIG. 7A, security tap 700 comprises a second Ethernet switch 756. Switch 756 is disposed between fan out buffers 732A, 732B and physical layer device 730E. Communication lines 714F, 716F from fan out buffers 732A, 732B are connected to switch 756. Switch 756 is connected to physical layer device 730E through communication line 758. Switch 756 contains ports that allows communication lines 714F, 716F to be integrated into a single communication line 758. Thus, switch 756 combines the data flow from both communication lines 714F, 716F into a single signal which is delivered by communication line 758 and ultimately to port 704E to intrusion detection system 712. Port 704E is configured to receive only outgoing information from security tap 700. In contrast, port 704F is configured to receive only incoming information from intrusion detection system 712. In other words, ports 704E, 704F are configured to receive uni-directional flow of data. (In contrast, in the embodiment of FIG. 3, port 304E is configured to receive uni-directional data flow while port 304F is configured for bi-directional data flow.) Thus, the sole function of port 704E is to access network data from security tap 700. In contrast, port 704F is a control signal port, whose sole function is to receive control signals in the form of kill data packets from the data device, the intrusion detection system. The factors for deciding whether to use security tap 700 of FIG. 7A or security tap 300 of FIG. 3 include the configuration of the corresponding connectors of the intrusion detection system.

It will be appreciated that switches 702, 756 may be the same switch. For example, the Scalable 12-Port Gigabit Ethernet MultiLayer Switch manufactured by Broadcom located in Irvine, Calif. In addition, Broadcom provides the hardware required to implement all of the required connections.

Figure 7B:
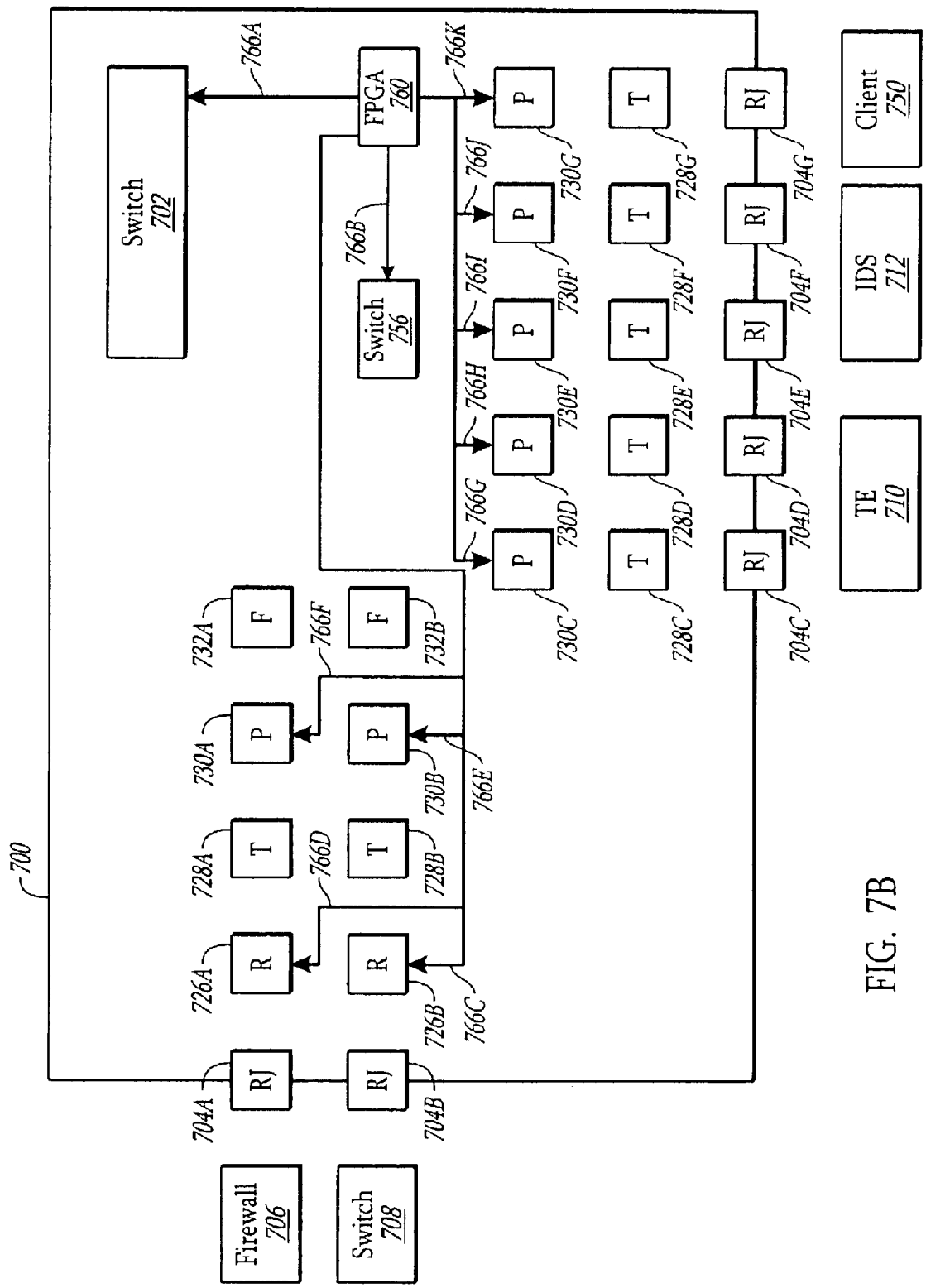
FIG. 7B illustrates a block diagram of the security tap of FIG. 7A illustrating how the FPGA controls other components of the security tap.

Furthermore, security tap 700 comprises an FPGA 760 that is connected to switches 702, 756 through communication lines 762, 764, respectively. FPGA 760 is also connected to client device 750 in much the same manner as in FIG. 6A. Accordingly, the connection between FPGA 760 and client device 750 will not be discussed in detail. The connection between FPGA 760 and client device 750 allows FPGA to be programmed with additional features. In one embodiment, FPGA 760 is configured to extract statistical information from switch 702 through communication line 762. FPGA 760 is also configured to control components of security tap 700. With reference to FIG. 7B, FPGA 760 controls switches 702, 756, physical layer devices 730A through 730G and relays 726A, 726B as indicated by control lines 766A through 766K.

Figure 7C:
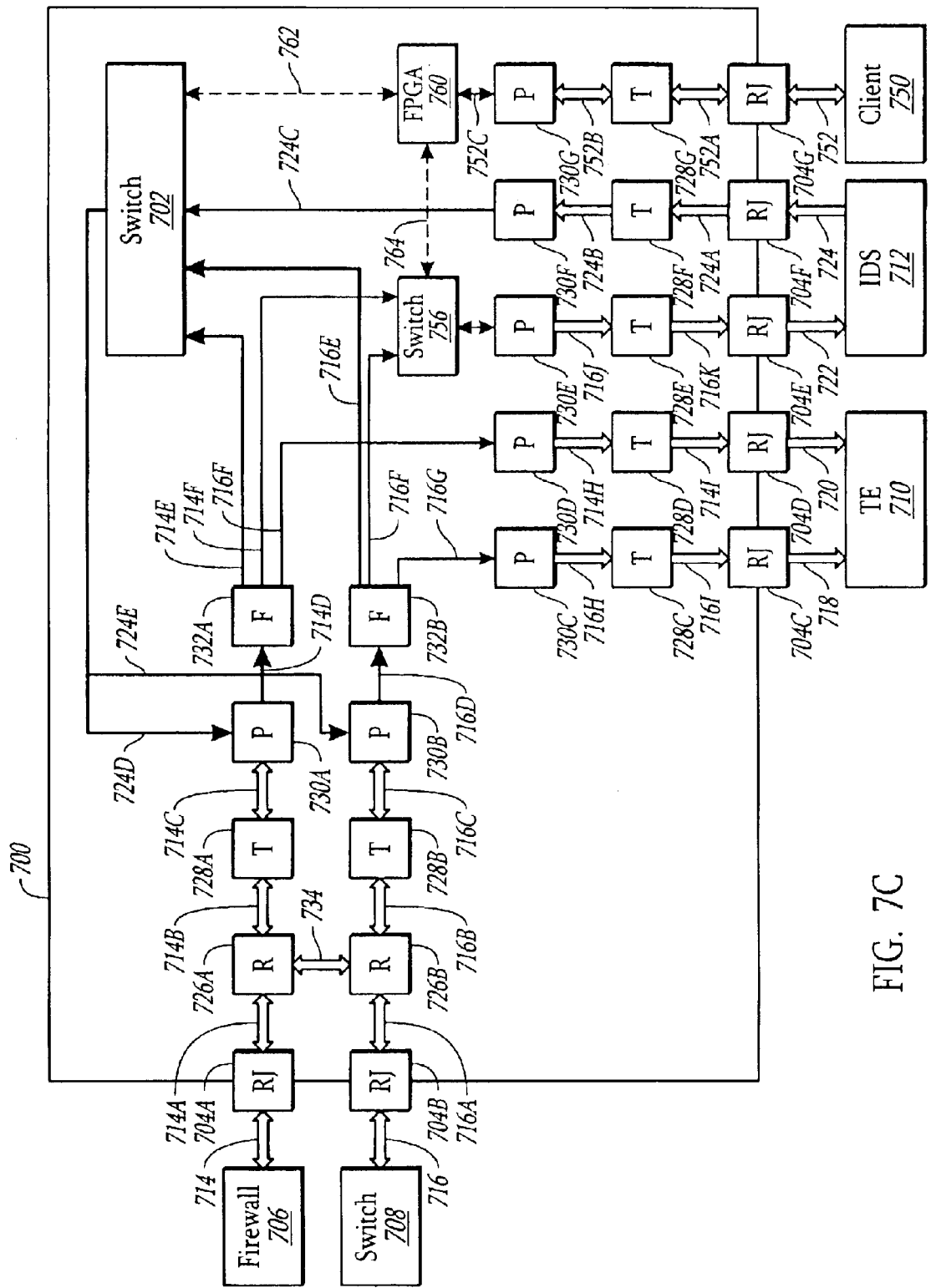
FIG. 7C illustrates a block diagram of signal formats for use in the security tap of FIG. 7A.

Different types of signaling formats may be used in security tap 700. As illustrated in FIG. 7C, in one embodiment, signals between ports 704A through 704G and physical layer devices 730A through 730G may be transmitted in Media Dependent Interface (MDI) format. This is represented by the double-lined arrows in FIG. 7C. Signals between one physical layer devices to another physical layer device may be transmitted in Serial Gigabit Media Independent Interface (SGMII) format which consist of serial 1.25 GHz encoding. This is indicated in FIG. 7C by single-lined arrows. The exception to this may be signals coming to and from FPGA 760, which may communicate with switches 702, 756 using a PCI bus, SPI communication or $I^2C$ serial communication format. This is represented in FIG. 7C by dashed-lined arrows. Those skilled in the art will recognize that other configurations may be used depending on design considerations.

Security tap 700 thus provides a number of features. First, switch 702 allows data from intrusion detection system 712 to be sent to firewall 706 without disrupting data flow through security tap 700. Second, switch 702 can collect some statistical information about the data flowing therethrough. This statistical information can be retrieved by FPGA 760 and sent to client device 750. Third, switch 756 simplifies the types of ports and connections that are required, allowing port 704F to have unidirectional data flow instead of bi-directional data flow. Fourth, FPGA 760 provides for control of components of security tap 700. Finally, FPGA 760 can be programmed by an external source (i.e., client device 750) to perform other functions.

Figure 7D:
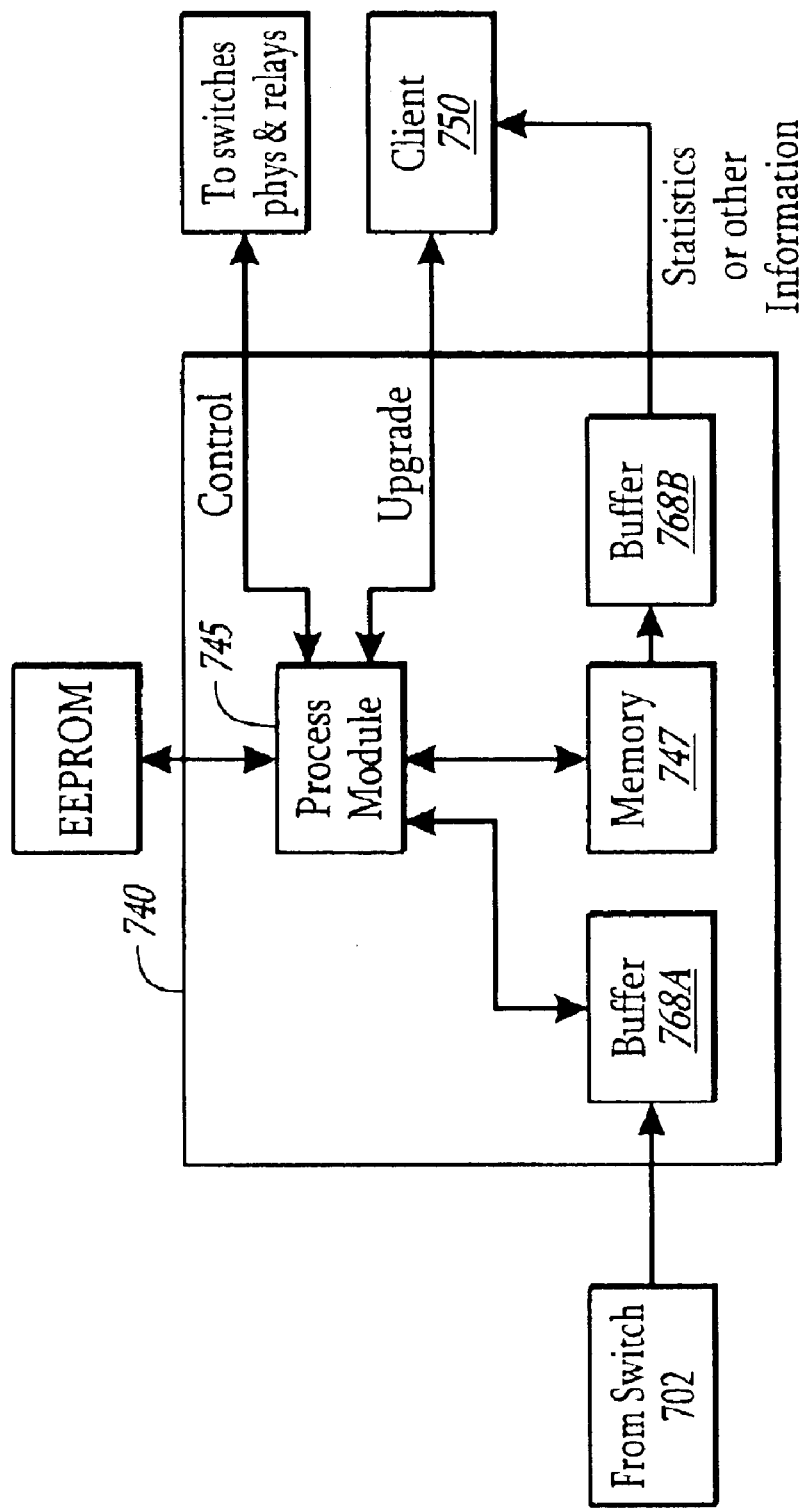
FIG. 7D illustrates a block diagram of the FPGA of FIG. 7A.

With reference to FIG. 7D, a block diagram of FPGA 760 is illustrated. Because switch 702 performs the function of routing data packets within security tap 700, it will be appreciated that FPGA 760 differs somewhat from that described in relation to FIGS. 5C and 6C. However, FPGA 760 can be used to extract statistics or other information from security tap 700. In the embodiment of FIG. 7D, FPGA 760 comprises process module 745, memory 747, and buffers 768A, 768B. Information from switch 702 is sent to buffer 768A in FPGA 760. The buffered information is then analyzed by process module 745. Certain statistics may be stored in memory 747. Upon request by client device 750, these statistics can be transferred to buffer 768B and then transmitted to client 750.

FPGA 760 also provides for the control of components of security tap 760. As shown in FIG. 7D, process module 745 can be connected to physical layer devices, relays, and switches to control their operation. In addition, the connection between FPGA 760 and client device 650 allows FPGA 760 to be reprogrammed by an external user.

Figure 7E:
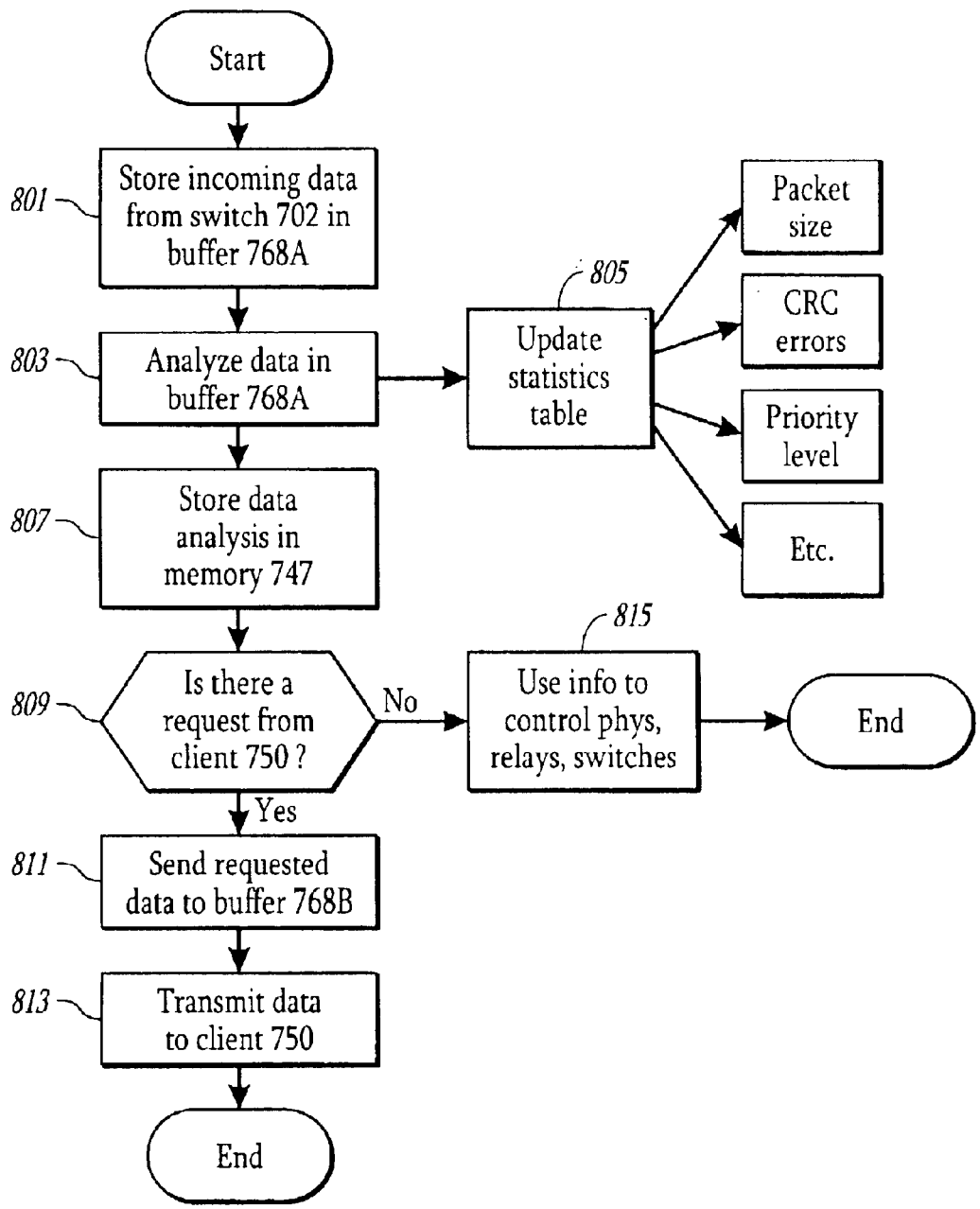
FIG. 7E illustrates a flow diagram of the process logic steps for the FPGA of FIG. 7A.

FIG. 7E illustrates a process logic flow diagram for FPGA 760 in one embodiment where FPGA 760 functions as a statistical collector. At step 801, incoming data from switch 702 is stored in buffer 768A. At step 803, process module 745 analyzes the data, depending on the type of predetermined statistics a user desires. For example, process module 745 may determine the packet size, existence of CRC errors, priority level and the like. At step 805, process module 745 may update a statistics table stored in memory 747. At step 807, the data analysis is stored in the local memory 747.

FPGA 760 may then do a number of things with the data stored in local memory 747. In one instance, FPGA 760 can respond to a request from client device 750. At step 809, client device 750 requests data from FPGA 760. At step 811, process module 745 processes the request and writes the requested data into buffer 768B. At step 813, process module 745 sends the requested data in buffer 768B to client device 750.

FPGA 760 may also use the data stored in local memory 747 to enable it to control switches, physical layer devices, or relays. At step 815, process module 745 accesses the data stored in local memory 747 to instruct it how to control or operate switches 702, 756 or other components of FPGA 760.

Figure 8A:
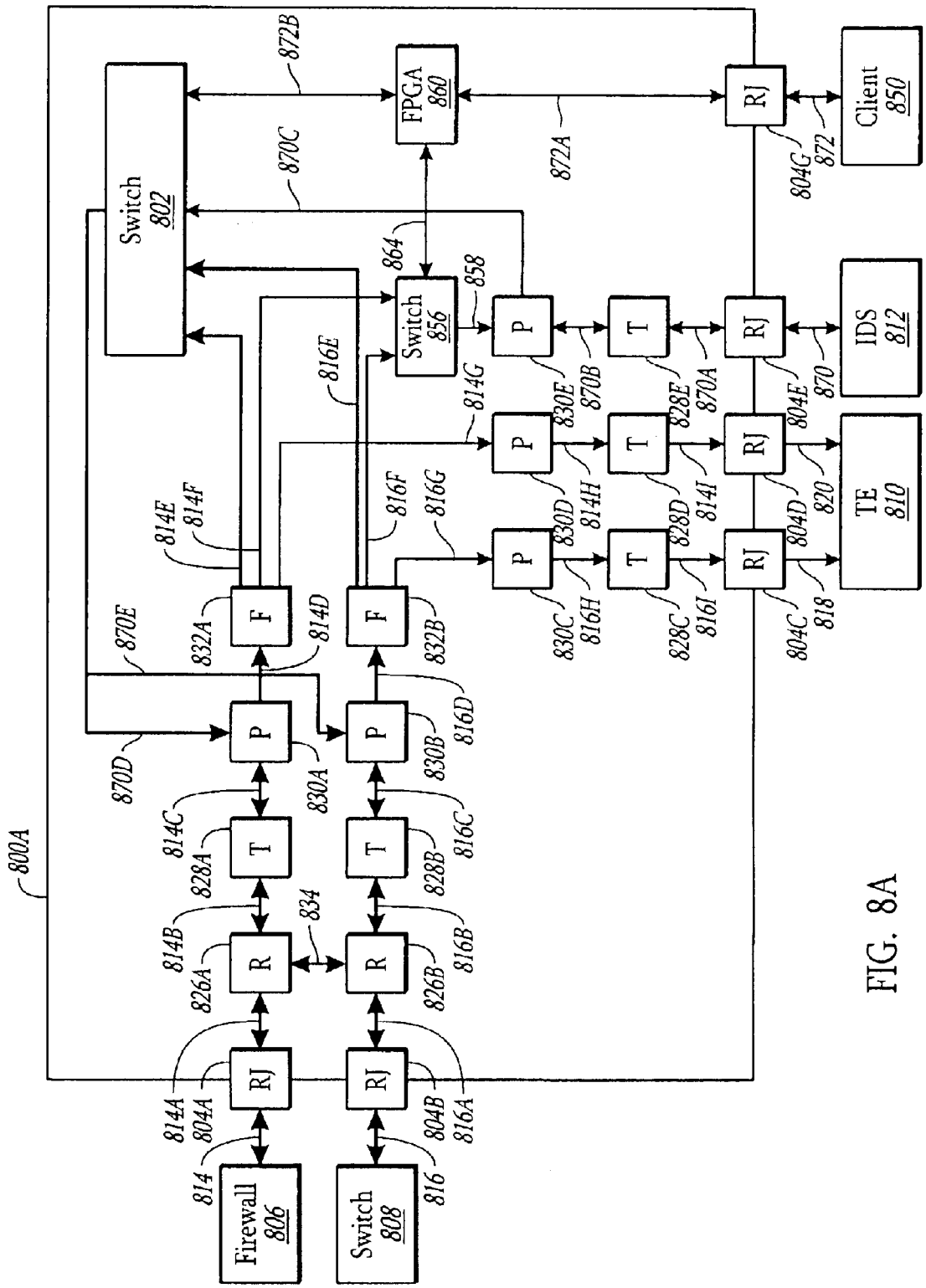
FIG. 8A illustrates a block diagram of a security tap of the present invention implementing a switch which allows an intrusion detection system to send information into the security tap, an FPGA for controlling components of the security tap, and a second switch which combines both directions of data into one port for connecting to an intrusion detection system.

FIG. 8A illustrates another embodiment of a security tap 800A. Many of the elements in FIG. 8A are similar to the elements in FIG. 7A. As such, like elements are referred to with like reference numerals, substituting 800's for 700's. Thus, a detailed description of security tap 800A will not be provided, except where new reference numbers are introduced.

The embodiment of FIG. 8A provides an alternative configuration for connecting security tap 800A to intrusion detection system 812 so that only a single connecting cable is required. That is, intrusion detection system 812 is connected to security tap 800A via port 804E. Intrusion detection system 812 is connected to port 804E by communication line 870, which is shown as a single cable. Communication line 870 thus provides for bi-directional (i.e., full-duplex) transmissions. This embodiment can be used for those intrusion detection system that require full-duplex transmission connections. This embodiment enables intrusion detection system 812 to omit a switch which the previous embodiments required in order to route the flow of data from port 304E and 304F to the intrusion detection system.

In further detail, a switch 856 combines the data flow of communication lines 814F and 816F into one outgoing communication line 858. Physical layer device 830E is configured to receive the data flow from communication line 858. In addition, physical layer device 830E is connected to switch 802 through communication line 870C to deliver data thereto. Physical layer device 830E also connects to transformer 828E through communication line 870B, which, in turn, is connected to port 804E through communication line 870A. Transformer 828E and port 804E are configured to allow bi-directional flow of communication therethrough. Thus, only a single port 804E is required to connect intrusion detection system 812 to security tap 800A. The embodiment of FIG. 8A dispenses with dual ports required to connect intrusion detection system 812 to security tap 800A.

In addition, the embodiment of FIG. 8A provides an alternative embodiment for the connection between FPGA 860 and client device 850. Port 804G comprises an Xport™ Embedded Device Server manufactured by Lantronix® located in Irvine, Calif. Xport™ can communicate with FPGA 860 by serial communication. The Xport configuration allows for direct communication between client device 850 and FPGA 860. Thus, client device 850 is connected to port 804G through communication line 872. Port 804G is connected directly to FPGA 860 through communication line 872A. This embodiment eliminates the requirement for a physical layer device and transformer to connect FPGA 860 to port 804G.

Switch 802 acts as a routing node in security tap 800A as discussed in detail with respect to FIG. 3. FPGA 860 is configured to control components of security tap 800A. The control links illustrated in FIG. 7B apply to the embodiment of FIG. 8A. In addition, the general concepts of the configuration of the signal format illustrated in FIG. 7C also apply to this particular embodiment. Furthermore, the process logic of FPGA 860 is similar to the process logic of FPGA 760 described with reference to FIGS. 7D and 7E.

Figure 8B:
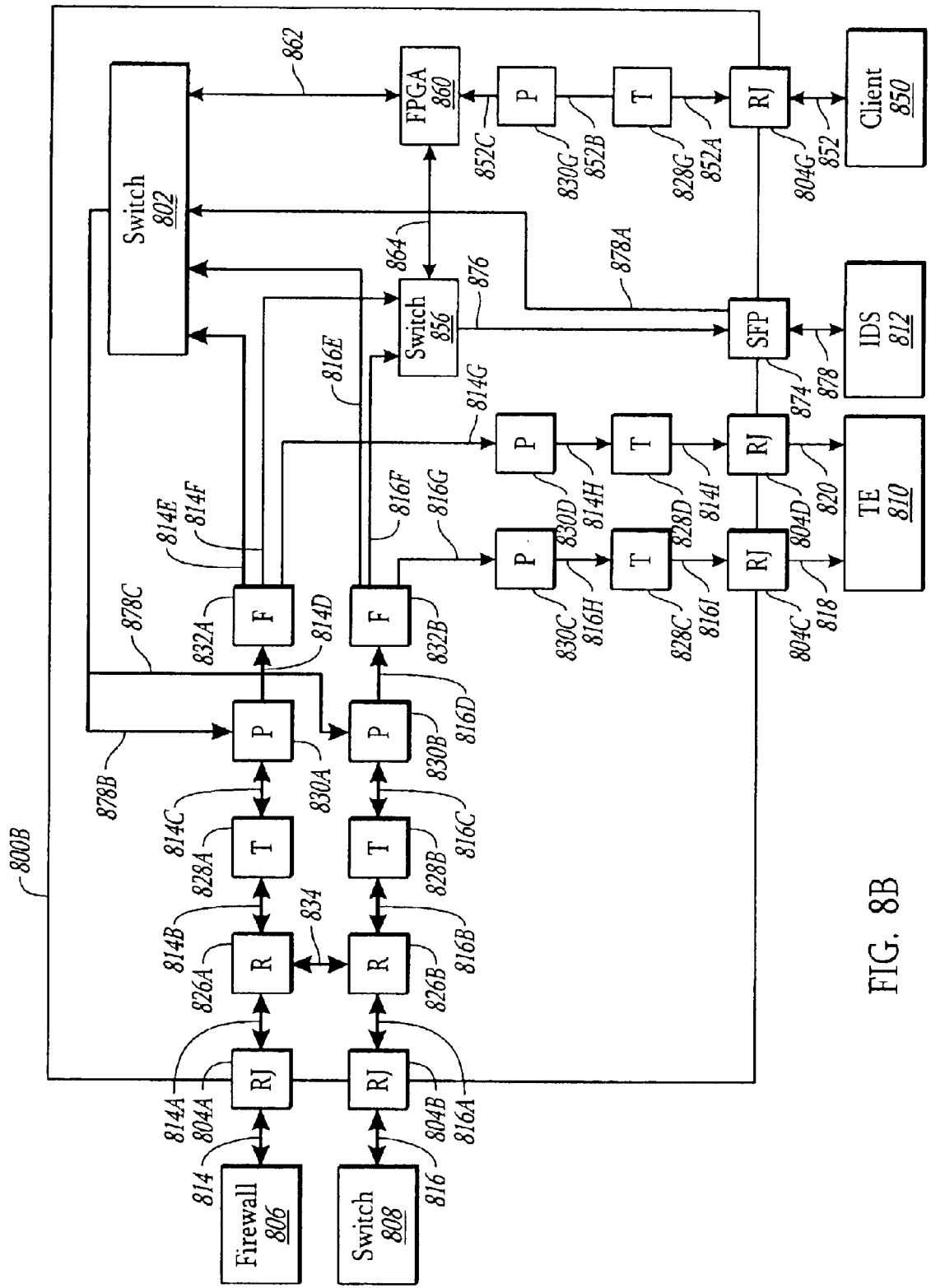
FIG. 8B illustrates a block diagram of a security tap of the present invention implementing a switch which allows an intrusion detection system to send information into the security tap, an FPGA for controlling components of the security tap, and a second switch with a combined metallic conductor port for connecting to an intrusion detection system.

FIG. 8B illustrates yet another embodiment of a security tap 800B. Many of the elements in FIG. 8B are similar to the elements in FIGS. 7A and 8A. Thus, a detailed description of security tap 800B will not be provided, except where new reference numbers are introduced.

The embodiment of FIG. 8B provides an alternative embodiment for the connection between security tap 800B and intrusion detection system 812. In this embodiment, port 874 replaces ports 704E and 704F of FIG. 7A. Port 874 is a Small Form Factor Pluggable (SFP) connector configured for Ethernet transmissions. In one embodiment, port 874 is configured for 10/100/Gigabit Ethernet transmissions. The SFP transceiver module can be plugged and unplugged from the housing of the security tap and not directly soldered thereto. This functionality allows for different types of SFP connectors to be coupled to security tap 800B. In one embodiment, the SFP connector is configured to couple to a conductive metallic wire connection. In another embodiment, the SFP connector is configured to couple to an optical fiber connection. The configuration of port 874 can be selected depending on the type of connection that intrusion detection system 812 requires. In addition, any port 804A through 804F (or any other port disclosed herein) may be configured to be interchangeable.

Switch 856 combines the data flow from communication lines 814F and 816F into a single outgoing communication line 876. Communication line 876 connects directly to port 874. In addition, port 874 is connected directly to switch 802 through communication line 878. Security tap 800B is thus configured with a single port to connect intrusion detection system 812.

As in previous embodiments, switch 802 acts as a routing node in security tap 800A and FPGA 860 is configured to control components of security tap 800B. The control lines illustrated in FIG. 7B apply to the embodiment of FIG. 8B. In addition, the general concepts of the configuration of the signal format illustrated in FIG. 7C also apply to this particular embodiment. Furthermore, the process logic of FPGA 860 is similar to the process logic of FPGA 760 described with reference to FIGS. 7D and 7E.

Figure 9A:
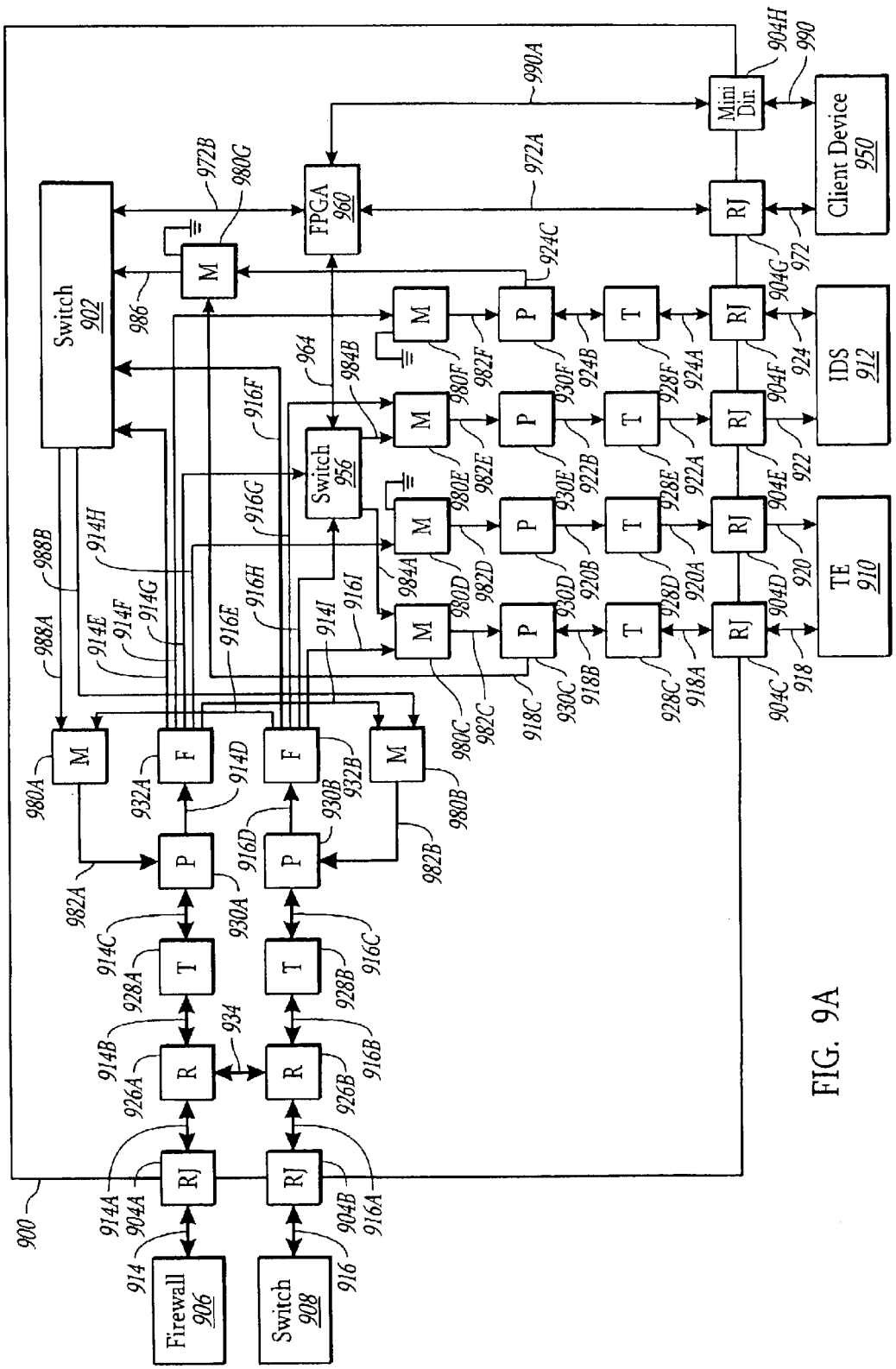
FIG. 9A illustrates a block diagram of a security tap of the present invention implementing a plurality of multiplexors, switches, and an FPGA for allowing the security tap to operate in a number of different modes.
Figure 9B:
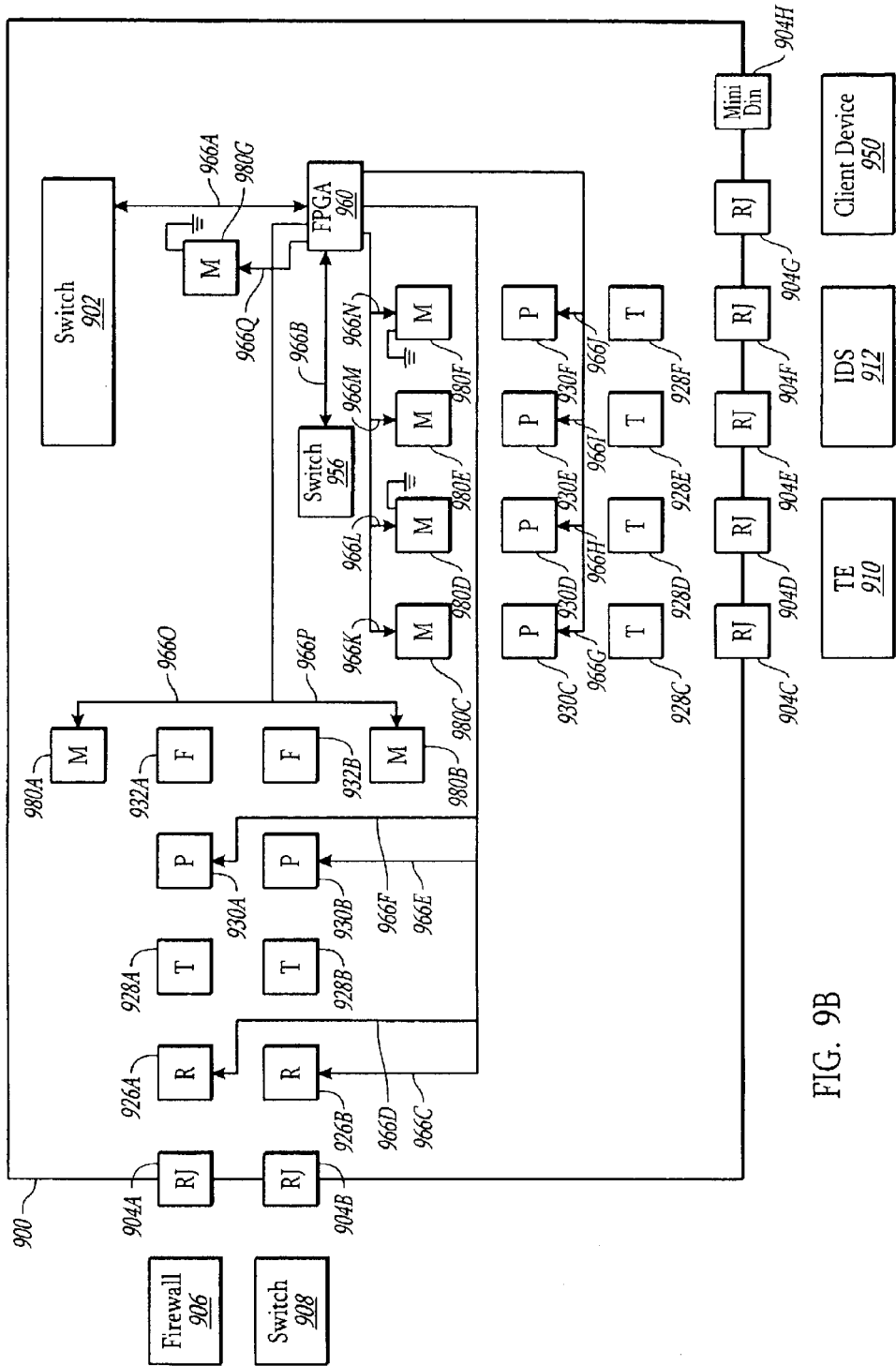
FIG. 9B illustrates a block diagram of the security tap of FIG. 9A illustrating how the FPGA controls other components of the security tap.

FIG. 9A illustrates yet another embodiment of a security tap 900. Again, many of the elements in FIG. 9A are similar to the elements in FIG. 7A. As such, like elements are referred to with like reference numerals, substituting 900's for 700's. Thus, a detailed description of security tap 900 will not be provided, except where new reference numbers are introduced.

The embodiment of FIG. 9A illustrates a security tap which can operate in different modes. These modes are made possible by multiplexors 980A through 980G, which operation will be described in more detail below. Multiplexors 980A through 980G are circuit devices that have several inputs and one user-selectable output.

The configuration of security tap 900 is substantially the same with respect to firewall 906, switch 908, ports 904A, 904B, relays 926A, 926B, transformers 928A, 928B and physical layer devices 930A, 930B. However, at fan out buffers 932A, 932B, the configuration of security tap 900 differs from the embodiment of FIG. 7A.

At fan out buffers 932A, 932B, the data packets are duplicated and sent out to a number of different locations. Fan out buffers 932A sends information to switch 902, multiplexor 980F, switch 956, multiplexor 980D and multiplexor 980B through communication lines 914E through 914I, respectively. Similarly, fan out buffer 932B send data packets to multiplexor 980A, switch 902, multiplexor 980E, switch 956 and multiplexor 980C through communication lines 916E through 916I, respectively.

Switch 956 combines the information from communication lines 914G and 916H. In addition, as will be discussed in more detail below, switch 956 mirrors or duplicates the combined information from communication lines 914G and 916H such that the mirrored information can be sent to both multiplexors 980C and 980E through communication lines 984A and 984B, respectively.

Multiplexors 980C through 980F send information to physical layer devices 930C through 930F through communication lines 982C through 982F, respectively. Physical layer devices 930C through 930F transmit information to transformers 928C through 928F through communication lines 918B, 920B, 922B, 924B, respectively. In addition, transformers 928C through 928F transmit information to ports 904C through 904F via communication lines 918A, 920A, 922A, 924A, respectively.

The reference numerals of the communication lines between physical layer devices 930C through 930F to ports 904C through 904F have been reassigned to indicate the difference in data flow compared to FIG. 7A. That is, data flow in communication lines 918, 918A, 918B, 924, 924A, 924B is now bi-directional. In contrast, data flow in communication lines 920, 920A, 920B, 922, 922A, 922B is uni-directional.

Physical layer devices 930C and 930F transmit information to multiplexor 980G through communication lines 918C, 924C, respectively. Multiplexor 980G is connected to switch 902 through communication line 986. Switch 902 is connected to multiplexors 980A, 980B through communication lines 988A, 988B, respectively. Finally, multiplexors 980A, 980B are connected to physical layer devices 930A, 930B through communication lines 982A, 982B, respectively.

It will be noted that client device 950 is connected to FPGA 960 in a similar manner as reflected in FIG. 8A. That is, port 904G can be configured as an Xport to allow serial communication between client device 950 and FPGA 960. In addition, security tap 900 includes port 904H configured as a Mini Din Serial port. In another embodiment, port 904H could be a DB-9 serial port. Client device 950 is connected to port 904H through communication line 990. In addition, port 904H is connected to FPGA 960 through communication line 990A. Port 904H enables serial communication between client device 950 and FPGA 960. Thus, client device 950 can communicate with FPGA 960 to debug security tap 900, configure the IP setup of security tap 900, and other control functions.

Having now described the connections between the various components in security tap, the operation of security tap 900 will be described. The combination of switch 902, switch 956 and multiplexors 980A through 980G allows security tap 900 to operate in different modes.

In the "passive" mode, neither testing equipment 910 or intrusion detection device 912 is allowed to transmit information into the network through the tap. In this embodiment, switches 902 and 956 and multiplexor 980G are taken out of the main data link by FPGA 960. Thus, even though data may be sent to these components from fan out buffers 932A, 932B, FPGA 960 controls the multiplexors so that the data coming and going to the switches is not used. FPGA 960 controls multiplexors 980A, 980B to select communication lines 914I and 916E and ignore lines 988A and 988B. While ports 904C and 904F are configured for bi-directional data flow, the data entering the security tap 900 from testing equipment 910 and intrusion detection device 912 is not used. Thus, each port 904C through 904F is required to properly connect testing equipment 910 and intrusion detection device 912. In addition, intrusion detection device 912 would require an additional communication line and external switch to communicate with firewall 906. Thus, it will be appreciated that security tap 900 can be operated in a completely passive manner.

In a "switching" mode, testing equipment 910 and intrusion detection device 912 are still not allowed to transmit information. However, in this embodiment, switch 902 is enabled while switch 956 is disabled by FPGA 960. At fan out buffers 932A, 932B, the communication lines that are used are communication lines 914E, 914F, 914H, 916F, 916G, 916I. Thus, an additional data path is created from switch 902 to multiplexors 980A, 980B through communication lines 988A, 988B. FPGA 960 controls multiplexors 980A, 980B to only acknowledge or accept information from communication lines 988A, 988B. Multiplexors 980A, 980B transmit information to physical layer devices 930A, 930B through communication lines 982A, 982B. Ports 904C through 904F still operate in a uni-directional mode. In addition, the testing equipment 910 and intrusion detection device 912 still operate in a passive manner.

In a "switching/return path" mode, switch 902 and multiplexor 980G are used while switch 956 is not used. Thus, in addition to the data flow possible in the "switching" mode, the return path formed by communication lines 918C, 924C between physical layer devices 930C, 930F and multiplexor 980G is enabled. Data flow through ports 904C and 904F is now bi-directional such that data packets (i.e., kill packets) can be sent from intrusion detection system 912 from either port. It will be appreciated that testing equipment 910 and intrusion detection system 912 are interchangeable. That is, intrusion detection system 912 may be connected to either ports 904C, 904D or ports 904E, 904F. Similarly, testing equipment 910 may be connected to either ports 904C, 904D or ports 904E, 904F. Thus, it is also contemplated that testing equipment 910 is able to transmit data packets into security tap 900 through either port 904C or port 904F.

In a "switching/return path/combined tap" mode, switches 902 and multiplexor 980G are enabled by FPGA 960. Thus, testing equipment 910 and intrusion detection system 912 are enable to send data packets into security tap 900 through ports 904C or 904E as described above. FPGA 960 controls multiplexors 980A, 980B to only acknowledge transmissions from communication lines 988A, 988B. In addition, different port configurations are possible depending on how FPGA 960 controls multiplexors 980C and 980E. These configurations are based on whether multiplexors 980C and 980E are enabled or disabled by FPGA 960. Essentially, FPGA 960 allows ports 904C through 904E to have different configurations based on the desire of the user.

The first port configuration is similar to the port configuration of FIG. 3. Ports 904C and 904E are configured to receive a representation of data transmissions from switch 908 through communication lines 916I and 916G, respectively. Ports 904D and 904F receive a representation of data transmission from firewall 906 through communication lines 914H and 914F, respectively. In this embodiment, switch 956 would be disabled. Alternatively, FPGA 960 would control multiplexors 980C and 980E to acknowledge only transmissions from communication lines 916I and 916G. Ports 904C and 904E are configured to allow bi-directional flow of data to allow testing equipment 910 or intrusion detection system 912 to send data packets therethrough. In addition, ports 904C and 904E are interchangeable to allow testing equipment 910 and intrusion detection system 912 to be interchangeable.

systems are configured to be connected to a security tap through a single cable. In addition, port 904C allows transmission of data packets from intrusion detection system 912.

In those embodiments where switch 956 is enabled to provide for differing port configurations, it will be appreciated that FPGA 960 can control switch 956 and multiplexors 980C through 980F so that different modes are enabled. The following table gives an example of the types of modes that can be enabled simultaneously. The terms OFF/ON are used for switch 956 to indicate whether the FPGA 960 has disabled or enabled switch 956. The term OFF is used with multiplexors 980D and 980F where no transmissions are allowed therethrough. The term ON is used with multiplexors 980C through 980F to indicate that the multiplexors simply allow whatever transmissions it is receiving to pass there through. The terms MODE 1 and MODE 2 are used with the multiplexors where there is a possibility of simultaneous transmissions from the fan out buffers and from switch 956. MODE 1 only acknowledges transmissions from the communication line coming from the fan out buffer. MODE 2 only acknowledges transmission from switch 956.

| Ports 904C/904D configuration | Ports 904E/904F configuration | Switch 956 | MUX 980C | MUX 980D | MUX 980E | MUX 980F |
| --- | --- | --- | --- | --- | --- | --- |
| First | First | OFF | ON | ON | ON | ON |
| First | Second | ON | MODE 1 | ON | MODE 2 | OFF |
| Third | First | ON | MODE 2 | OFF | MODE 1 | ON |
| Third | Second | ON | MODE 2 | OFF | MODE 2 | OFF |

The second port configuration is similar to the port configuration of FIG. 7A. In this embodiment, FPGA 960 enables switch 956. Switch 956 combines the information from fan out buffers 932A, 932B. Switch 956 duplicates the combined information and sends the information to multiplexors 980C and 980E through communication lines 984A, 984B. The second port configuration focuses on ports 904E and 904F. FPGA 960 controls multiplexor 980E to acknowledge transmissions from switch 956, but not communication line 916G. In addition, FPGA 960 controls multiplexor 980F to not acknowledge transmissions from communication line 914F. It will be appreciated that all of the necessary information contained in communication lines 916G and 914F is represented in communication line 984B. Thus, port 904E contains only outgoing data flow and port 904F contains only ingoing data flow. As discussed above with respect to FIG. 7A, such a port configuration may be advantageous in some intrusion detection systems.

The third port configuration is similar to the port configuration of FIG. 8A. In this embodiment, FPGA 960 enables switch 956, which sends a duplicate of information to multiplexor 980C through communication line 984A. The third port configuration focuses on ports 904C and 904D. FPGA 960 controls multiplexor 980C to ignore the transmissions from communication line 916I and use communication line 984A to send out port 904C. In addition, FPGA 960 controls multiplexor 980D to ignore the transmissions from communication line 914H. It will be appreciated that all of the necessary information contained in communication lines 916I and 914H is represented in communication line 984A. Thus, port 904C is configured to allow bi-directional data flow while port 904D is essentially disabled. As discussed above, some embodiments of intrusion detections As discussed above, each configuration of ports may be interchangeably used for either testing equipment 910 or intrusion detection system 912. Thus, it will be appreciated that different combinations of testing equipment 910 and intrusion detection systems 912 may be connected to security tap 900 at any one time, depending on the user's preferences. In addition, it is not required to use both sets of ports at the same time.

In a "switching/combined tap" mode, switches 902 and 956 are enabled while multiplexor 980G is disabled. This disables the return paths created by communication lines 918C and 918D. However, different port configurations are still enabled depending on how the components of security tap 900 are operated by FPGA 960. For example, the first port configuration discussed above is possible, wherein multiplexors 980C through 980F acknowledge transmissions from communication lines 914F, 916G, 914G and 916I, respectively.

In addition, a fourth port configuration is possible in either ports 904C and 904D or ports 904E and 904F. Regarding ports 904C and 904D, FPGA 960 disables multiplexor 980D. Port 904C delivers a representation of the signal from the main communication cable as combined by switch 956. FPGA 960 controls multiplexor 980C to acknowledge only transmissions from communication line 984A. Because multiplexor 980G is also disabled, the return path from physical layer device 930C to multiplexor 980G is disabled. Thus, only uni-directional transmission flow through port 904C. In addition, multiplexor 980D is disabled so that no transmissions are allowed through port 904D. Thus, testing equipment 910 or intrusion detection system 912 may be connected to port 904C through a single cable to operate in a passive manner.

Regarding ports 904E and 904F, port 904E delivers a representation of the signal from the main communication cable as combined by switch 956. However, FPGA 960 disables multiplexor 980F so that transmissions are not allowed through port 904F. Thus, testing equipment 910 or intrusion detection system 912 may be connected to port 904E through a single cable to operate in a passive manner.

The following table provides the types of port configurations that can be operated simultaneously in the "switching/combined tap" mode, with the same terminology from the previous table being applied here.

| Ports 904C/904D configuration | Ports 904E/904F configuration | Switch 956 | MUX 980C | MUX 980D | MUX 980E | MUX 980F |
|---|---|---|---|---|---|---|
| First | First | OFF | ON | ON | ON | ON |
| First | Fourth | ON | MODE 1 | ON | MODE 2 | OFF |
| Fourth | First | ON | MODE 2 | OFF | MODE 1 | ON |
| Fourth | Fourth | ON | MODE 2 | OFF | MODE 2 | OFF |

In view of the foregoing, network tap 900 may operate in a number of different modes controlled by the operation of FPGA 960. Within these modes are a number of port configurations which may be used to connect different types of testing equipment or intrusion detection systems. This may be advantageous where different manufacturers of testing equipment or intrusion detection systems may implement different connections such that security tap 900 may be used on virtually any network system.

Switching between modes may be facilitated by a software program located on client device 950. Preferably, a password or another type of appropriate management security is required to operate the software to prevent unauthorized access to the network. Alternatively, software may be loaded into FPGA 960 through client device 950. In still another embodiment, a user may be able to manually switch modes through switches or buttons on the front panel of security tap 900.

As in previous embodiments, switch 902 acts as a routing node in security tap 900. In addition, FPGA 960 allows the embodiment of FIG. 9A to have all of the functionality described with reference to FIG. 7A. That is, FPGA 960 controls switches, physical layer devices, relays, and now multiplexors in FIG. 9B by control lines 966A through 966Q. FPGA 960 may obtain statistics from switches 902, 956. FPGA 960 is also programmable such that a user may program additional functionality through client device 950. Furthermore, the general concepts of the configuration of the signal format illustrated in FIG. 7C also apply to this particular embodiment. In addition, the process logic of FPGA 960 is similar to the process logic of FPGA 760 described with reference to FIGS. 7D and 7E.

Those of skill in the art will recognize that the configuration of the routing node depends on many design considerations. The FPGA allows a user to customize the types of statistics to be extracted from the system, whereas a switch provides only limited statistics. The FPGA can be programmed on-site or remotely, providing the user increased flexibility in its functional capabilities, whereas the switch is not programmable although it can be dynamically controlled. The FPGA theoretically has a higher efficiency in preventing data collisions than the switch, whereas switches are known to drop some packets. The hardware for an FPGA is also less expensive than a switch.

On the other hand, the FPGA requires extensive programming time, whereas switch technology is already developed in the art. Because the FPGA must be custom-designed, the development costs may be higher than those associated with the use of switches. The FPGA embodiments also may require extra physical layer devices to convert the signals to SGMII format, thus adding additional cost. However, a company called Xilinx, located in San Jose, Calif., makes FPGA devices which have built-in SERDES that can receive differential signals up to 3.125 GHz. Using a Xilinx Virtex-II Pro FPGA, the extra physical layer devices would not be required.

An additional benefit of using an FPGA is that the operation of the network tap can be digitally controlled in a robust and programmable way. This permits the network tap to perform any of a variety of operations that have not been possible in conventional network taps that do not include an FPGA or a similar digital controller. Some of these functions include the network analysis and statistics gathering operations described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A network tap that permits an attached device to communicate with a node of a network, comprising:
   a first port that can receive an end of a first segment of a network cable;
   a second port that can receive an end of a second segment of a network cable, the first port and the second port permitting network data to be communicated between the first segment and the second segment; and
   at least one tap port through which a copy of the network data can be transmitted to an attached device, the network tap being configured to receive device data from the attached device and to communicate the received data through at least one of the first port and the second port.

2. The network tap of claim 1, wherein the at least one tap port comprises a first tap port that can transmit the copy of the network data to the attached device and can receive the device data from the attached device.

3. The network tap of claim 1, wherein the at least one tap port comprises a first tap port that can transmit the copy of the network data to the attached device and a second tap port that can receive the device data from the attached device.

4. The network tap of claim 1, further comprising a network switch in communication with the first port and the at least one tap port, wherein the network switch is configured to receive the device data from the attached device and to direct the received device data to the first port.

5. The network tap of claim 4, wherein the first port is adapted to communicate with a firewall of the network, and wherein the device data includes a kill packet for controlling the operation of the firewall.

6. The network tap of claim 5, wherein the at least one tap port is adapted to communicate with an intrusion detection system that is capable of generating the kill packet.

7. The network tap of claim 1, further comprising an integrated circuit that is positioned at an intersection of communication lines associated with:
- a device data port through which the network tap receives the device data;
- the first port; and
- the second port.

8. The network tap of claim 7, wherein the integrated circuit includes a first buffer for receiving the device data and a second buffer for receiving the network data, the first buffer and the second buffer cooperating to insert the device data onto the communication line associated with the first port without interfering with the network data.

9. The network tap of claim 8, wherein the integrated circuit is a Field Programmable Gate Array.

10. The network tap of claim 1, wherein the network tap is configured to receive the device data from the attached device and to communicate the received data through the first port to a firewall in communication with the first segment of the network cable and through the second port to a node of the network in communication with the second segment of the network cable.

11. The network tap of claim 1, wherein the first port and the second port are configured such that network data can be communicated between the first segment and the second segment regardless of whether power is supplied to the network tap.

12. The network tap of claim 1, further comprising a switch for combining network data received by the network tap at the first port and network data received by the network tap at the second port into a single signal that can be accessed by an attached device through a single tap port.

13. The network tap of claim 1, further comprising a management port through which a remote computer can control operational features of the network tap.

14. The network tap of claim 1, further comprising means for switching the network tap between:
- an enable mode in which the network tap is enabled to receive the device data from the attached device and to communicate the received data through at least one of the first port and the second port; and
- a disable mode in which the network tap is disabled from communicating device data through either the first port and the second port.

15. In a network tap that permits an attached device to communicate with a node of a network, a method for communicating a control signal to a firewall, comprising:
- at the network tap, in response to receiving network data from a first port of the network tap in communication with a firewall in the network:
  - passing the network data through a second port of the network tap to a node in the network; and
  - transmitting a copy of the network data through at least one tap port of the network tap to an attached device;
- receiving from the attached device a control signal that is to be transmitted to the firewall; and
- transmitting the control signal through the first port of the network tap to the firewall.

16. The method of claim 15, further comprising transmitting the control signal through the second port to the node in the network.

17. The method of claim 15, wherein the control signal that is to be transmitted to the firewall is received from the attached device through said at least one tap port.

18. The method of claim 15, wherein the control signal that is to be transmitted to the firewall is received from the attached device through a control signal port of the network tap that is distinct from said at least one tap port.

19. The method of claim 15, wherein:
- the attached device comprises an intrusion detection system that monitors the network data from the firewall; and
- the control signal comprises a kill packet that controls operation of the firewall.

20. The method of claim 15, wherein receiving the control signal and transmitting the control signal through the first port is performed by a network switch included in the network tap, wherein the network switch is in communication with the first port and the at least one tap port.

21. The method of claim 20, wherein the network switch comprises an Ethernet switch.

22. The method of claim 15, wherein:
- receiving the control signal comprises storing the control signal in a buffer of an integrated circuit included in the network tap; and
- transmitting the control signal through the first port comprises:
  - monitoring outgoing network data transmitted from the second port to the first port of the network tap; and
  - inserting the control signal in the outgoing network data at a time when it is determined that the outgoing network data otherwise includes only idle data.

23. The method of claim 22, wherein monitoring the network data transmitted from the second port to the first port of the network tap comprises:
- storing the outgoing network data in another buffer of the integrated circuit; and
- determining whether the stored outgoing network data includes only idle data.

24. The method of claim 22, wherein the integrated circuit comprises a Field Programmable Gate Array.

25. The method of claim 15, further comprising:
- losing power at the network tap; and
- continuing to pass the network data between the first port and the second port notwithstanding the loss of power.

26. A network tap that permits an attached intrusion detection system to communicate with a firewall of a network, comprising:
- a first port that can receive an end of a first segment of a network cable, the first segment being in communication with the firewall;
- a second port that can receive an end of a second segment of a network cable, the second segment of the network cable being in communication with a node of the network, the first port and the second port permitting network data to be communicated between the first segment and the second segment;
- at least one tap port that can be connected with an intrusion detection system, the at least one tap port permitting a copy of the network data to be transmitted to the intrusion detection system and further being capable of receiving kill packets from the intrusion detection system; and
- a routing node that is in communication with the first port, the second port, and a communication line associated with the at least one tap port, the routing node being configured to:
  - pass network data between the first port and the second port; and
  - transmit the kill packet from the communication line associated with the at least one tap port to the firewall.

27. The network tap of claim 26, wherein the routing node comprises an Ethernet switch.

28. The network tap of claim 26, wherein the routing node comprises a Field Programmable Gate Array.

29. The network tap of claim 26, further comprising a first communication line from the first port to the routing node and a second communication line from the second port to the routing node, each of the first communication line and the second communication line including:

a relay for circumventing the routing node in the event of loss of power at the network tap;

a transformer; and a fan out buffer that propagates the network data to the routing node and propagates a copy of the network data to the at least one tap port.

30. The network tap of claim 26, further comprising, in addition to said at least one tap port, one or more other tap ports that enable an attached device in addition to the intrusion detection system to also access a copy of the network data.

* * * * *

UNITED STATES PATENT AND TRADEMARK OFFICE
CERTIFICATE OF CORRECTION

| | | |
|---|---|---|
| PATENT NO. | : 6,898,632 B2 | |
| APPLICATION NO. | : 10/409006 | |
| DATED | : May 24, 2005 | |
| INVENTOR(S) | : Gordy et al. | |

It is certified that error appears in the above-identified patent and that said Letters Patent is hereby corrected as shown below:

Drawings,
Sheet 6, Figure 4B, replace the figure as shown below to change the mis-numbered reference "304F" above the box marked "IDS" to --312--:

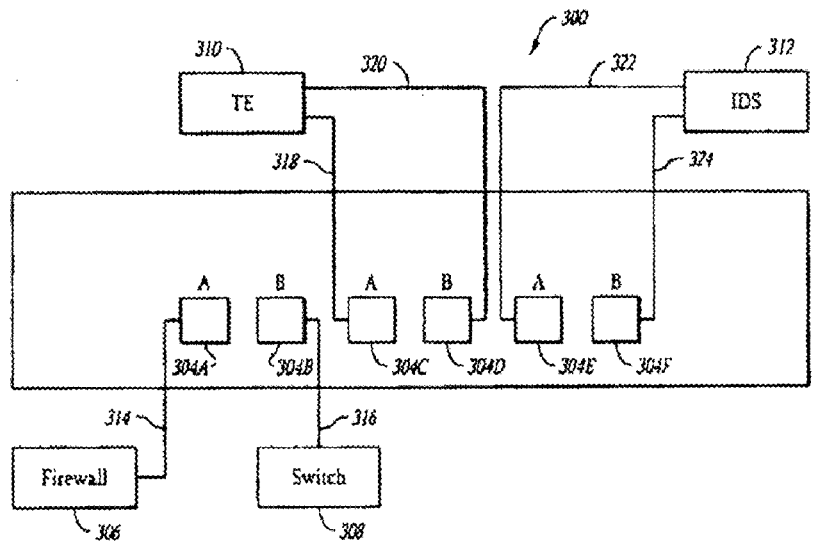

FIG. 4B

Drawings,
Sheet 11, Figure 5D, in the box marked "502", replace "446B" with --446A--

Column 5,
Line 23, after "Ethernet" change "switches" to --switch--

Column 7,
Line 57, after "specific patterns," change "detects" to --detect--

Column 8,
Line 16, after "(referred" insert --to--

Column 9,
Line 52, after "security tap" change "10E." to --110E.--

UNITED STATES PATENT AND TRADEMARK OFFICE
CERTIFICATE OF CORRECTION

PATENT NO.       : 6,898,632 B2
APPLICATION NO.  : 10/409006
DATED            : May 24, 2005
INVENTOR(S)      : Gordy et al.

It is certified that error appears in the above-identified patent and that said Letters Patent is hereby corrected as shown below:

Column 10,
Line 26, before "programmable" remove "a,"
Line 54, before "non-intrusive" change "require" to --requires--
Line 66, after "RJ-45 ports" change "connects" to --connect--

Column 11,
Line 45, change "firewall 308" to --switch 312--

Column 12,
Line 29, before "connected" remove "are"
Line 30, change "3161, 3141," to --316I, 314I,--
Line 39, after "Marvell" insert --®--
Line 50, change "3141," to --314I,--

Column 13,
Line 52, change "3381." to --338I.--

Column 14,
Line 14, change "consist" to --consists--

Column 16,
Line 25, change "illustrates" to --illustrated--
Line 29, change "326A, 326B" to --626A, 626B--
Line 41, change "collects" to --collect--
Line 63, after "FPGA 640. FPGA" insert --640--

Column 17,
Line 49, before "communication" change "allows" to --allow--

Column 18,
Line 30, after "physical layer" change "devices" to --device--
Line 32, after "format which" change "consist" to --consists--

Column 21,
Line 20, after "buffer 932B" change "send" to --sends--

Column 22,
Line 5, after "components in security tap" insert --900--
Line 65, after "enable" to --enabled--

UNITED STATES PATENT AND TRADEMARK OFFICE
CERTIFICATE OF CORRECTION

PATENT NO. : 6,898,632 B2
APPLICATION NO. : 10/409006
DATED : May 24, 2005
INVENTOR(S) : Gordy et al.

It is certified that error appears in the above-identified patent and that said Letters Patent is hereby corrected as shown below:

Column 23,
Line 67, after "intrusion" change "detections" to --detection--

Column 24,
Line 60, after "transmission" change "flow" to --flows--

Signed and Sealed this

Twenty-first Day of October, 2008

JON W. DUDAS
*Director of the United States Patent and Trademark Office*